US012464396B2

(12) United States Patent
Pan et al.

(10) Patent No.: US 12,464,396 B2
(45) Date of Patent: Nov. 4, 2025

(54) CHANNEL SOUNDING METHOD AND COMMUNICATION APPARATUS

(71) Applicant: HUAWEI TECHNOLOGIES CO., LTD., Guangdong (CN)

(72) Inventors: Dongcheng Pan, Nanjing (CN); Peng Chen, Nanjing (CN); Bo Yang, Nanjing (CN); Yinliang Hu, Nanjing (CN); Junhui Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 428 days.

(21) Appl. No.: 17/993,331

(22) Filed: Nov. 23, 2022

(65) Prior Publication Data

US 2023/0090009 A1 Mar. 23, 2023

Related U.S. Application Data

(63) Continuation of application No. PCT/CN2021/090598, filed on Apr. 28, 2021.

(30) Foreign Application Priority Data

May 26, 2020 (CN) ........................ 202010457081.3

(51) Int. Cl.
*H04L 12/26* (2006.01)
*H04W 24/08* (2009.01)
*H04W 24/10* (2009.01)

(52) U.S. Cl.
CPC ........... *H04W 24/10* (2013.01); *H04W 24/08* (2013.01)

(58) Field of Classification Search
CPC ..... H04W 24/10; H04W 24/08; H04W 74/06; H04W 36/0094; H04W 76/15; H04W 84/12; H04W 12/06; H04L 5/0053; H04L 5/0091; H04L 5/0051
See application file for complete search history.

(56) References Cited

U.S. PATENT DOCUMENTS

2018/0262936 A1* 9/2018 Zhou ..................... H04W 24/10
2024/0236784 A1* 7/2024 Henry ................... H04W 36/32
2024/0323055 A1* 9/2024 Suh ...................... H04B 7/0626

FOREIGN PATENT DOCUMENTS

CN 106031244 A 10/2016
CN 110214422 A 9/2019

(Continued)

OTHER PUBLICATIONS

IEEE Std 802.11™-2016, "IEEE Standard for Information technology—Telecommunications and information exchange between systems Local and metropolitan area networks—Specific requirements; Part 11: Wireless LAN Medium Access Control (MAC) and Physical Layer (PHY) Specifications," Dec. 7, 2016, 3534 pages.

(Continued)

*Primary Examiner* — Thai Dinh Hoang
(74) *Attorney, Agent, or Firm* — Fish & Richardson P.C.

(57) ABSTRACT

This application discloses a channel sounding method and a communication apparatus. The method includes: A first access point receives a channel transfer command frame from a controller or a central access point, and sends a channel transfer frame to a second access point. The channel transfer command frame indicates the first access point to send a channel sounding result of at least one station to the second access point. The channel transfer command frame includes a first sounding dialog token number. The channel transfer frame carries a channel sounding result corresponding to a first sounding dialog token in channel sounding results of a plurality of stations. The first access point forwards the channel sounding result of the at least one station to the second access point.

10 Claims, 15 Drawing Sheets

STA 1
AP 1
AP 2
Controller/ Central access point
S6011: Sounding dialog token number
S6011: Sounding dialog token number
S601: Channel transfer command frame. The channel transfer command frame indicates the AP 1 to send a channel sounding result of at least one station to the AP 2. The channel transfer command frame includes identifier information of the AP 2, identifier information of the at least one station, and a first sounding dialog token number
S602: Construction frame. The construction frame indicates the AP 2 to construct an NDP frame and an NDPA frame. The NDP frame is for channel sounding. The NDPA frame indicates at least one station to perform channel sounding, and the at least one station is associated with the AP 1
S603: Constructed NDP frame and NDPA frame (carrying the first sounding dialog token number)
TO FIG. 6B
TO FIG. 6B
TO FIG. 6B
TO FIG. 6B

(56) References Cited

FOREIGN PATENT DOCUMENTS

| | | | | | |
|---|---|---|---|---|---|
| EP | 4064781 | A1 | * | 9/2022 | H04L 5/0048 |
| KR | 20230005686 | A | * | 1/2023 | H04L 5/0053 |
| TW | 202339530 | A | * | 10/2023 | G01S 13/87 |
| WO | WO-2021246807 | A1 | * | 12/2021 | G01S 5/02 |
| WO | WO-2022163266 | A1 | * | 8/2022 | H04W 92/20 |
| WO | WO-2023059665 | A1 | * | 4/2023 | G01S 13/878 |
| WO | WO-2023101363 | A1 | * | 6/2023 | H04L 27/2603 |

OTHER PUBLICATIONS

IEEE P802.11ax/D4.1, "Draft Standard for Information technology—Telecommunications and information exchange between systems Local and metropolitan area networks—Specific requirements; Part 11: Wireless LAN Medium Access Control (MAC) and Physical Layer (PHY) Specifications Amendment 1: Enhancements for High Efficiency WLAN," Apr. 2019, 754 pages.

IEEE Std 802.11ac-2013, "IEEE Standard for Information technology—Telecommunications and information exchange between systems Local and metropolitan area networks—Specific requirements, Part 11: Wireless LAN Medium Access Control (MAC) and Physical Layer (PHY) Specifications; Amendment 4: Enhancements for Very High Throughput for Operation in Bands below 6 GHz," Dec. 11, 2013, 425 pages.

IEEE Std 802.11n-2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," Sep. 11, 2009, 536 pages.

* cited by examiner

| L-STF | L-LTF | L-SIG | VHT-SIG-A | VHT-STF | VHT-LTF | VHT-SIG-B |
|---|---|---|---|---|---|---|

FIG. 10

CHANNEL SOUNDING METHOD AND COMMUNICATION APPARATUS

CROSS-REFERENCE TO RELATED APPLICATIONS

This application is a continuation of International Application No. PCT/CN2021/090598, filed on Apr. 28, 2021, which claims priority to Chinese Patent Application No. 202010457081.3, filed on May 26, 2020. The disclosures of the aforementioned applications are hereby incorporated by reference in their entireties.

TECHNICAL FIELD

This application relates to the field of wireless fidelity technologies, and in particular, to a channel sounding method and a communication apparatus.

BACKGROUND

The 802.11 standard supports inter-frequency deployment of adjacent access points (APs). In other words, different center frequencies of frequency band resources are allocated to adjacent APs (which may also be considered that different frequency band resources are allocated to the adjacent APs), and data is transmitted on the allocated resources. However, if a wide frequency band resource is allocated to an AP, there is no sufficient resource for inter-frequency deployment of all APs. As a result, a plurality of APs are deployed on a same frequency.

When the plurality of APs are deployed, a physical space distance between them needs to meet a specific distance, to avoid interference to data transmission of the plurality of APs. Alternatively, the plurality of APs need to perform data transmission on the allocated resources according to the carrier sense multiple access/collision detection (carrier sense multiple access with collision detection, CSMA/CA) protocol, to be specific, only one AP can perform data transmission at a same moment.

To improve a network transmission rate, the plurality of APs may be allowed to concurrently send data. However, it needs to be ensured that the plurality of APs do not interfere with each other, in other words, a station (STA) associated with an AP is not interfered by data sending of another AP. The plurality of APs may be allowed to concurrently send data in an interference nulling mode. However, in the interference nulling mode, channel sounding needs to be performed across APs, to be specific, each AP in the plurality of intra-frequency deployed APs not only needs to obtain a channel of a STA associated with the AP, but also needs to obtain a channel of a STA not associated with the AP. Currently, there is no corresponding solution to how to perform channel sounding across APs.

SUMMARY

This application provides a channel sounding method and a communication apparatus, to perform channel sounding across APs, so as to increase a data transmission rate in a network as much as possible.

According to a first aspect, an embodiment of this application provides a channel sounding method. The method may be performed by a first apparatus. The first apparatus may be a communication device or a communication apparatus that can support the communication device in implementing functions required for the method, for example, a chip system. For example, the communication device is a first access point. The method includes the following steps:

The first access point receives a channel transfer command frame from a controller or a central access point. The channel transfer command frame may indicate the first access point to send a channel sounding result of at least one station to a second access point. The channel transfer command frame includes identifier information of the second access point, identifier information of the at least one station, and a first sounding dialog token number. The at least one station is associated with the first access point. The first sounding dialog token number may be used by the first access point to identify whether the channel sounding result of the at least one station belongs to the first access point.

The first access point sends a channel transfer frame to the second access point based on the channel transfer command frame. The channel transfer frame carries a channel sounding result corresponding to the first sounding dialog token number, identifier information of the first access point, and the identifier information of the at least one station.

In this embodiment of this application, after receiving the channel transfer command frame, the first access point may forward, to the second access point, a channel sounding result that belongs to the second access point in the channel sounding result of the at least one station associated with the first access point. In other words, channel sounding is performed across access points, so that a plurality of intra-frequency deployed adjacent access points can concurrently send data, and a data transmission rate in an entire network is improved.

In a possible implementation, before the sending, by the first access point, a channel transfer frame to the second access point based on the channel transfer command frame, the method further includes the following steps:

The first access point receives channel response frames separately sent by a plurality of stations. The channel response frame includes a channel sounding result of each station and a second sounding dialog token number.

If the second sounding dialog token number is different from a sounding dialog token number allocated to the first access point, and the second sounding dialog token number is the same as the first sounding dialog token number, the first access point determines to send the channel transfer frame to the second access point.

In this solution, the sounding dialog token number is used to distinguish a specific access point to which the channel sounding result belongs, to be specific, the first access point may identify, by using the sounding dialog token number, a specific access point to which the channel sounding result of the least one station belongs, and further send the channel transfer frame to the corresponding access point. Even if the channel sounding result sent by the at least one station includes both a channel sounding result belonging to the first access point and the channel sounding result belonging to the second access point, the channel sounding result belonging to the second access point can be accurately forwarded to the second access point.

In a possible implementation, the sending, by the first access point, a channel transfer frame to the second access point based on the channel transfer command frame includes:

After receiving the channel transfer command frame, the first access point sends the channel transfer frame to the second access point.

As an alternative solution of the foregoing solution, the sounding dialog token number does not need to be set to distinguish a specific access point to which the channel sounding result belongs. When the first access point receives the channel transfer command frame, it is considered by default that channel sounding is performed by another access point for a station associated with the first access point, and the channel transfer frame is directly sent to the another access point. This is simple.

In a possible implementation, the method further includes:

The first access point sends a channel report poll (it can also called beamforming report poll, BFRP) frame to a plurality of stations associated with the first access point, where the BFRP frame carries a station list, the station list includes the identifier information of the at least one station, and the BFRP frame is used to successively obtain the channel sounding result of the at least one station.

In this solution, if the second access point needs to obtain channel sounding results of the plurality of stations associated with the first access point, the first access point may indicate, by using the BFRP frame, the plurality of stations to successively feed back the channel sounding results, to ensure that all the plurality of stations send the channel sounding results to the first access point, and not only some stations send the channel sounding results to the first access point.

In a possible implementation, at least one sounding dialog token number allocated to the first access point is different from at least one sounding dialog token number allocated to the second access point.

It should be understood that the sounding dialog token number may identify a specific access point to which an NDP frame for channel sounding belongs in each channel sounding process. Therefore, different sounding dialog token numbers may be allocated to different access points. A specific manner of allocating the sounding dialog token numbers to the different access points is not limited in this embodiment of this application. The following provides two possible allocation manners.

For example, the different sounding dialog token numbers correspond to the different access points, and the first sounding dialog token number is one of the at least one sounding dialog token number allocated to the second access point.

In this allocation manner, only one sounding dialog token dialog number needs to be allocated to one AP, so that a sounding dialog token number resource can be saved and it is more flexible.

For still another example, a first channel sounding group and a second channel sounding group are allocated to the first access point. The first channel sounding group includes one or more sounding dialog token numbers. The second channel sounding group includes one or more sounding dialog token numbers. The first channel sounding group corresponds to a station associated with the first access point. The second channel sounding group corresponds to a station not associated with the first access point.

As an alternative allocation manner, one group of sounding dialog token numbers is allocated to a station associated with each access point, and another group of sounding dialog token numbers is allocated to a station not associated with the access point. The two groups of sounding dialog token numbers are different. It is simple and easy to implement.

According to a second aspect, an embodiment of this application provides another channel sounding method. The method may be performed by a second apparatus. The second apparatus may be a communication device or a communication apparatus that can support the communication device in implementing functions required for the method, for example, a chip system. For example, the communication device is a second access point. The method includes the following steps:

The second access point receives a construction frame from a controller or a central access point. The construction frame indicates the second access point to construct a null data packet (NDP) frame and a null data packet announcement (NDPA) frame. The NDPA frame indicates at least one station to perform channel sounding. The NDP frame is for channel sounding. The at least one station is associated with a first access point.

The second access point constructs the NDPA frame and the NDP frame based on the construction frame, and sends the NDPA frame and the NDP frame to the at least one station.

The second access point receives a channel transfer frame sent by the first access point. The channel transfer frame carries a channel sounding result corresponding to a first sounding dialog token. A channel sounding result of the at least one station is fed back by the at least one station to the first access point. The first sounding dialog token is used to identify whether the channel sounding result of the at least one station belongs to the second access point.

In a possible implementation, the construction frame includes NDPA information, NDP information, and a first sounding dialog token number allocated to the second access point.

In a possible implementation, the constructing, by the second access point, the NDPA frame and the NDP frame based on the construction frame includes:

The second access point generates the NDPA frame based on the first sounding dialog token number and the NDPA information; and the second access point generates the NDP frame based on a token number and the NDP information.

In a possible implementation, at least one sounding dialog token number allocated to the second access point is different from at least one sounding dialog token number allocated to the first access point.

In a possible implementation, different sounding dialog token numbers correspond to different access points, and the first sounding dialog token number is one of the at least one sounding dialog token number allocated to the second access point.

In a possible implementation, a third channel sounding group and a fourth channel sounding group are allocated to the second access point. The third channel sounding group includes one or more sounding dialog token numbers. The fourth channel sounding group includes one or more sounding dialog token numbers. The third channel sounding group corresponds to a station associated with the second access point. The fourth channel sounding group corresponds to a station not associated with the second access point.

In a possible implementation, the method further includes:

The second access point sends a channel update complete announcement frame to the controller or the central access point. The channel update complete announcement frame is used to notify a channel sounding state, and the channel sounding state indicates that a channel sounding result is correct, incorrect, or lost.

For beneficial effects of the second aspect and the implementations thereof, refer to descriptions of beneficial effects of the method and the implementations thereof in the first aspect. Details are not described herein again.

According to a third aspect, a communication apparatus is provided. For example, the communication apparatus is the foregoing first access point or an apparatus disposed in the first access point. The communication apparatus is configured to perform the method according to the first aspect or the possible implementations of the first aspect. Specifically, the communication apparatus may include modules configured to perform the method according to the first aspect or the possible implementations of the first aspect, for example, include a processing module and a transceiver module that are coupled to each other. For example, the communication apparatus is foregoing first access point.

The transceiver module is configured to receive a channel transfer command frame from a controller or a central access point. The channel transfer command frame indicates the first access point to send a channel sounding result of at least one station to a second access point. The channel transfer command frame includes identifier information of the second access point, identifier information of the at least one station, and a first sounding dialog token number. The at least one station is associated with the first access point. The first sounding dialog token number is used by the first access point to identify whether the channel sounding result of the at least one station belongs to the first access point.

The processing module is configured to control, based on the channel transfer command frame, the transceiver module to send a channel transfer frame to the second access point. The channel transfer frame carries a channel sounding result corresponding to the first sounding dialog token number, identifier information of the first access point, and the identifier information of the at least one station.

In a possible implementation, the transceiver module is further configured to: before the first access point sends a channel transfer frame to the second access point based on the channel transfer command frame, receive channel response frames separately sent by a plurality of stations. The channel response frame includes a channel sounding result of each station and a second sounding dialog token number. The processing module is specifically configured to: when the second sounding dialog token number is different from a sounding dialog token number allocated to the first access point, and the second sounding dialog token number is the same as the first sounding dialog token number, determine to send the channel transfer frame to the second access point.

In a possible implementation, the processing module is specifically configured to: after receiving the channel transfer command frame, send the channel transfer frame to the second access point.

In a possible implementation, the transceiver module is further configured to:

send a channel report poll BFRP frame to a plurality of stations associated with the first access point, where the BFRP frame carries a station list, the station list includes the identifier information of the at least one station, and the BFRP frame is used to successively obtain the channel sounding result of the at least one station.

In a possible implementation, at least one sounding dialog token number allocated to the first access point is different from at least one sounding dialog token number allocated to the second access point.

In a possible implementation, different sounding dialog token numbers correspond to different access points, and the first sounding dialog token number is one of the at least one sounding dialog token number allocated to the second access point.

In a possible implementation, a first channel sounding group and a second channel sounding group are allocated to the first access point. The first channel sounding group includes one or more sounding dialog token numbers. The second channel sounding group includes one or more sounding dialog token numbers. The first channel sounding group corresponds to a station associated with the first access point. The second channel sounding group corresponds to a station not associated with the first access point.

According to a fourth aspect, another communication apparatus is provided. For example, the communication apparatus is the foregoing second access point or an apparatus disposed in the second access point. The communication apparatus is configured to perform the method according to the second aspect and any possible implementation of the second aspect. Specifically, the communication apparatus may include modules configured to perform the method according to the second aspect or the possible implementations of the second aspect, for example, include a processing module and a transceiver module that are coupled to each other. For example, the communication apparatus is foregoing second access point.

The transceiver module is configured to receive a construction frame from a controller or a central access point. The construction frame indicates the second access point to construct an NDP frame and an NDPA frame. The NDPA frame indicates at least one station to perform channel sounding. The NDP frame is for channel sounding. The at least one station is associated with a first access point.

The processing module is configured to construct the NDPA frame and the NDP frame based on the construction frame, and control the transceiver module to send the NDPA frame and the NDP frame to the at least one station.

The transceiver module is further configured to receive a channel transfer frame sent by the first access point. The channel transfer frame carries a channel sounding result corresponding to a first sounding dialog token. A channel sounding result of the at least one station is fed back by the at least one station to the first access point. The first sounding dialog token is used to identify whether the channel sounding result of the at least one station belongs to the second access point.

In a possible implementation, the construction frame includes NDPA information, NDP information, and a first sounding dialog token number allocated to the second access point.

In a possible implementation, the processing module is specifically configured to:

generate the NDPA frame based on the first sounding dialog token number and the NDPA information; and generate the NDP frame based on the NDP information.

In a possible implementation, at least one sounding dialog token number allocated to the second access point is different from at least one sounding dialog token number allocated to the first access point.

In a possible implementation, different sounding dialog token numbers correspond to different access points, and the first sounding dialog token number is one of the at least one sounding dialog token number allocated to the second access point.

In a possible implementation, a third channel sounding group and a fourth channel sounding group are allocated to the second access point. The third channel sounding group includes one or more sounding dialog token numbers. The fourth channel sounding group includes one or more sounding dialog token numbers. The third channel sounding group corresponds to a station associated with the second access point. The fourth channel sounding group corresponds to a station not associated with the second access point.

In a possible implementation, the transceiver module is further configured to:

send a channel update complete announcement frame to the controller or the central access point, where the channel update complete announcement frame is used to notify a channel sounding state, and the channel sounding state indicates that a channel sounding result is correct, incorrect, or lost.

According to a fifth aspect, still another communication apparatus is provided. For example, the communication apparatus is the foregoing first access point or an apparatus disposed in the first access point. For example, the communication apparatus is a chip disposed in the first access point. The communication apparatus includes a processor and a transceiver, configured to implement the method according to the first aspect or the possible implementations of the first aspect. For example, the transceiver is implemented by using an antenna, a feeder, and a codec in the first access point. Alternatively, if the fourth communication apparatus is the chip disposed in the first access point, the transceiver is, for example, a communication interface in the chip. The communication interface is connected to a radio frequency transceiver component in the first access point, to receive and send information by using the radio frequency transceiver component.

The transceiver is configured to receive a channel transfer command frame from a controller or a central access point. The channel transfer command frame indicates the first access point to send a channel sounding result of at least one station to a second access point. The channel transfer command frame includes identifier information of the second access point, identifier information of the at least one station, and a first sounding dialog token number. The at least one station is associated with the first access point. The first sounding dialog token number is used by the first access point to identify whether the channel sounding result of the at least one station belongs to the first access point.

The processor is configured to control, based on the channel transfer command frame, the transceiver to send a channel transfer frame to the second access point. The channel transfer frame carries a channel sounding result corresponding to the first sounding dialog token number, identifier information of the first access point, and the identifier information of the at least one station.

In a possible implementation, the transceiver is further configured to: before the first access point sends a channel transfer frame to the second access point based on the channel transfer command frame, receive channel response frames separately sent by a plurality of stations. The channel response frame includes a channel sounding result of each station and a second sounding dialog token number. The processor is specifically configured to: when the second sounding dialog token number is different from a sounding dialog token number allocated to the first access point, and the second sounding dialog token number is the same as the first sounding dialog token number, determine to send the channel transfer frame to the second access point.

In a possible implementation, the processor is specifically configured to: after receiving the channel transfer command frame, send the channel transfer frame to the second access point.

In a possible implementation, the transceiver is further configured to:

send a channel report poll BFRP frame to a plurality of stations associated with the first access point, where the BFRP frame carries a station list, the station list includes the identifier information of the at least one station, and the BFRP frame is used to successively obtain the channel sounding result of the at least one station.

In a possible implementation, at least one sounding dialog token number allocated to the first access point is different from at least one sounding dialog token number allocated to the second access point.

In a possible implementation, different sounding dialog token numbers correspond to different access points, and the first sounding dialog token number is one of the at least one sounding dialog token number allocated to the second access point.

In a possible implementation, a first channel sounding group and a second channel sounding group are allocated to the first access point. The first channel sounding group includes one or more sounding dialog token numbers. The second channel sounding group includes one or more sounding dialog token numbers. The first channel sounding group corresponds to a station associated with the first access point. The second channel sounding group corresponds to a station not associated with the first access point.

According to a sixth aspect, another communication apparatus is provided. For example, the communication apparatus is the foregoing second access point or an apparatus disposed in the second access point. For example, the communication apparatus is a chip disposed in the second access point. The communication apparatus includes a processor and a transceiver, configured to implement the method according to the second aspect or the possible implementations of the second aspect. For example, the transceiver is implemented by using an antenna, a feeder, and a codec in the second access point. Alternatively, if the fourth communication apparatus is the chip disposed in the second access point, the transceiver is, for example, a communication interface in the chip. The communication interface is connected to a radio frequency transceiver component in the second access point, to receive and send information by using the radio frequency transceiver component.

The transceiver is configured to receive a construction frame from a controller or a central access point. The construction frame indicates the second access point to construct an NDP frame and an NDPA frame. The NDPA frame indicates at least one station to perform channel sounding. The NDP frame is for channel sounding. The at least one station is associated with a first access point.

The processor is configured to construct the NDPA frame and the NDP frame based on the construction frame, and control the transceiver to send the NDPA frame and the NDP frame to the at least one station.

The transceiver is further configured to receive a channel transfer frame sent by the first access point. The channel transfer frame carries a channel sounding result corresponding to a first sounding dialog token. A channel sounding result of the at least one station is fed back by the at least one station to the first access point. The first sounding dialog token is used to identify whether the channel sounding result of the at least one station belongs to the second access point.

In a possible implementation, the construction frame includes NDPA information, NDP information, and a first sounding dialog token number allocated to the second access point.

In a possible implementation, the processor is specifically configured to:

generate the NDPA frame based on the first sounding dialog token number and the NDPA information; and generate the NDP frame based on the NDP information.

In a possible implementation, at least one sounding dialog token number allocated to the second access point is different from at least one sounding dialog token number allocated to the first access point.

In a possible implementation, different sounding dialog token numbers correspond to different access points, and the first sounding dialog token number is one of the at least one sounding dialog token number allocated to the second access point.

In a possible implementation, a third channel sounding group and a fourth channel sounding group are allocated to the second access point. The third channel sounding group includes one or more sounding dialog token numbers. The fourth channel sounding group includes one or more sounding dialog token numbers. The third channel sounding group corresponds to a station associated with the second access point. The fourth channel sounding group corresponds to a station not associated with the second access point.

In a possible implementation, the transceiver is further configured to:

send a channel update complete announcement frame to the controller or the central access point, where the channel update complete announcement frame is used to notify a channel sounding state, and the channel sounding state indicates that a channel sounding result is correct, incorrect, or lost.

According to a seventh aspect, still another possible communication apparatus is provided. The communication apparatus may be the first access point in the foregoing method designs. For example, the communication apparatus is a chip disposed in the first access point. The communication apparatus includes a memory configured to store computer-executable program code, and a processor coupled to the memory. The processor is coupled to the memory. The program code stored in the memory includes an instruction. When the processor executes the instruction, the communication apparatus is enabled to perform the method according to the first aspect and any possible implementation of the first aspect.

In some embodiments, the communication apparatus may further include a communication interface. The communication interface may be a transceiver in the first access point. For example, the transceiver is implemented by using an antenna, a feeder, a codec, and the like in the first access point. Alternatively, if the communication apparatus is a chip disposed in the first access point, the communication interface may be an input/output interface of the chip, for example, an input/output pin.

According to an eighth aspect, still another communication apparatus is provided. The communication apparatus may be the second access point in the foregoing method designs. For example, the communication apparatus is a chip disposed in the second access point. The communication apparatus includes a memory configured to store computer-executable program code, and a processor coupled to the memory. The processor is coupled to the memory. The program code stored in the memory includes an instruction. When the processor executes the instruction, the communication apparatus is enabled to perform the method according to the second aspect and any possible implementation of the second aspect.

In some embodiments, the communication apparatus may further include a communication interface. The communication interface may be a transceiver in the second access point. For example, the transceiver is implemented by using an antenna, a feeder, a codec, and the like in the second access point. Alternatively, if the communication apparatus is a chip disposed in the second access point, the communication interface may be an input/output interface of the chip, for example, an input/output pin.

According to a ninth aspect, a communication system is provided. The communication system may include the communication apparatus according to the third aspect, the communication apparatus according to the fifth aspect, or the communication apparatus according to the seventh aspect, and include the communication apparatus according to the fourth aspect, the communication apparatus according to the sixth aspect, or the communication apparatus according to the eighth aspect. It should be understood that the communication system may include more access points and/or stations.

According to a tenth aspect, an embodiment of this application provides a chip system. The chip system includes a processor, and may further include a memory, configured to implement the method performed by the first access point in the first aspect or the second access point in the second aspect. The chip system may include a chip, or may include a chip and another discrete component.

According to an eleventh aspect, an embodiment of this application further provides a computer readable storage medium, including instructions. When the instructions are run on a computer, the computer is enabled to perform the method performed by the first access point in the first aspect or the second access point in the second aspect, to implement a function performed by the first access point in the first aspect or the second access point in the second aspect.

According to a twelfth aspect, an embodiment of this application further provides a computer program product. The computer program product stores instructions. When the instructions are run on a computer, the computer is enabled to perform the method performed by the first access point in the first aspect or the second access point in the second aspect, to implement a function performed by the first access point in the first aspect or the second access point in the second aspect.

For beneficial effects of the third aspect to the twelfth aspect and the implementations of thereof, refer to descriptions of beneficial effects of the method and the implementations of the first aspect or the method and the implementations of the second aspect.

BRIEF DESCRIPTION OF DRAWINGS

FIG. 10 is a schematic diagram of a structure of a channel transfer command frame according to an embodiment of this application;

DESCRIPTION OF EMBODIMENTS

To make objectives, technical solution, and advantages of embodiments of this application clearer, the following further describes embodiments of this application in detail with reference to the accompanying drawings.

Embodiments of this application may be applied to a wireless local area network (wireless local area network, WLAN) scenario, and may be applied to an IEEE 802.11 system standard, or a next-generation standard or a further next-generation standard. Alternatively, embodiments of this application may be applied to a wireless local area network system, for example, an internet of things (IoT) or a vehicle-to-everything (Vehicle to X, V2X) network. Certainly, embodiments of this application may be further applied to another possible communication system, for example, a long term evolution (LTE) system, an LTE frequency division duplex (FDD) system, LTE time division duplex (TDD), a universal mobile telecommunication system (UMTS), a worldwide interoperability for microwave access (WiMAX) communication system, and a new radio (NR) communication system.

Figure 1:
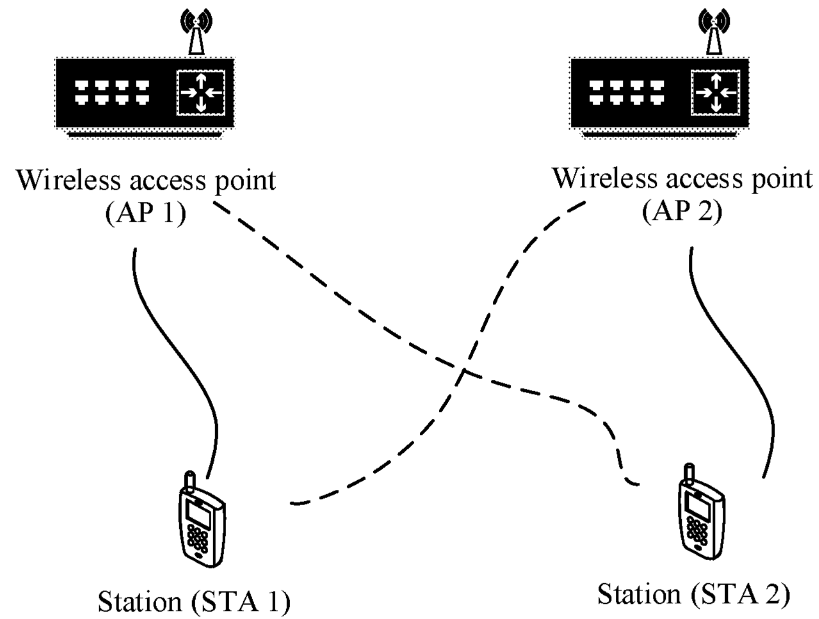
FIG. 1 shows a network architecture of a wireless local area network to which an embodiment of this application is applicable.

For example, FIG. 1 is a diagram of a network architecture of a WLAN to which an embodiment of this application is applicable. FIG. 1 shows an example in which the WLAN includes two APs (an AP 1 and an AP 2), a STA 1 associated with the AP 1, and a STA 2 associated with the AP 2. It should be understood that a STA associated with an AP, in other words, the STA connected to the AP, can receive a radio frame sent by the AP, and can also send a radio frame to the AP. Accordingly, a STA that is not associated with an AP, in other words, the STA not connected to the AP, cannot directly send the radio frame to the AP, and cannot directly receive the radio frame sent by the AP. Alternatively, the STA can send the radio frame to the AP, but the AP cannot correctly parse the received radio frame.

In FIG. 1, because the STA 1 is associated with the AP 1 and is not associated with the AP 2. To distinguish this association, in FIG. 1, a solid line indicates an association between the STA 1 and the AP 1, and a dashed line indicates a non-association between the STA 1 and the AP 2. Similarly, a solid line indicates an association between the STA 2 and the AP 2, and a dashed line indicates an association between the STA 2 and the AP 1. It should be noted that a quantity of APs and a quantity of STAs in FIG. 1 are merely an example. There may be more or less APs and STAs. For example, in addition to the STA 1, a STA associated with the AP 1 may further include another STA. In addition to the STA 2, a STA associated with the AP 2 may further include another STA. For another example, the WLAN shown in FIG. 1 may further include more APs. Embodiments of this application are also applicable to communication between APs. For example, the APs can communicate with each other through a distributed system (DS), and any AP can communicate with a STA associated with the AP and/or a STA not associated with the AP. This embodiment of this application is also applicable to communication between STAs.

The station STA in this embodiment of this application may be various user terminals, user apparatuses, access apparatuses, subscriber stations, subscriber units, mobile stations, user agents, user equipment, or the like in another name that have a wireless communication function. The user terminal may include various handheld devices, vehicle-mounted devices, wearable devices, computing devices, or other processing devices connected to a wireless modem that have a wireless communication function; and various forms of user equipment (UE), mobile stations (MS), terminals, terminal equipment, portable communication devices, handheld devices, portable computing devices, entertainment devices, game devices or systems, global positioning system devices or any other proper devices configured to perform network communication by using a wireless medium, and the like. Herein, for ease of description, the devices mentioned above are collectively referred to as stations or STAs. The access point AP in embodiments of this application is an apparatus that is deployed in a wireless communication network and that provides a wireless communication function for a STA associated with the access point AP. The access point AP may be used as a hub of the communication system, and may be a communication device such as a base station, a router, a gateway, a repeater, a communication server, a switch, or a bridge. The base station may include various forms of macro base stations, micro base stations, relay stations, and the like. Herein, for ease of description, the devices mentioned above are collectively referred to as access points APs.

The AP and the STA in some embodiments of this application may be an AP and a STA to which an IEEE 802.11 system standard is applicable. For example, the STA is usually a terminal product that supports media access control (MAC) and a physical layer (PHY) of the 802.11 system standard, for example, a mobile phone or a notebook computer. The AP is usually a network-side product that supports media access control (MAC) and a physical layer (PHY) of the 802.11 system standard, for example, a router or a repeater.

The AP may allocate a resource to the STA. The STA performs data transmission on the allocated resource. The 802.11 standard supports inter-frequency deployment of adjacent APs. In other words, different center frequencies of frequency band resources are allocated to adjacent APs (which may also be considered that different frequency band resources are allocated to the adjacent APs), and data is transmitted on the allocated resources. However, if a wide frequency band resource is allocated to an AP, there is no sufficient resource for inter-frequency deployment of all APs. As a result, a plurality of APs are deployed on a same frequency. Intra-frequency deployment means that resources allocated to the adjacent APs partially or completely overlap. When the plurality of APs are deployed, a physical space distance between them needs to meet a specific distance, to avoid interference to data transmission of the plurality of APs. Alternatively, the plurality of APs need to perform data transmission on the allocated resources according to the CSMA/CA protocol, in other words, only one AP can perform data transmission at a same moment.

Figure 2:
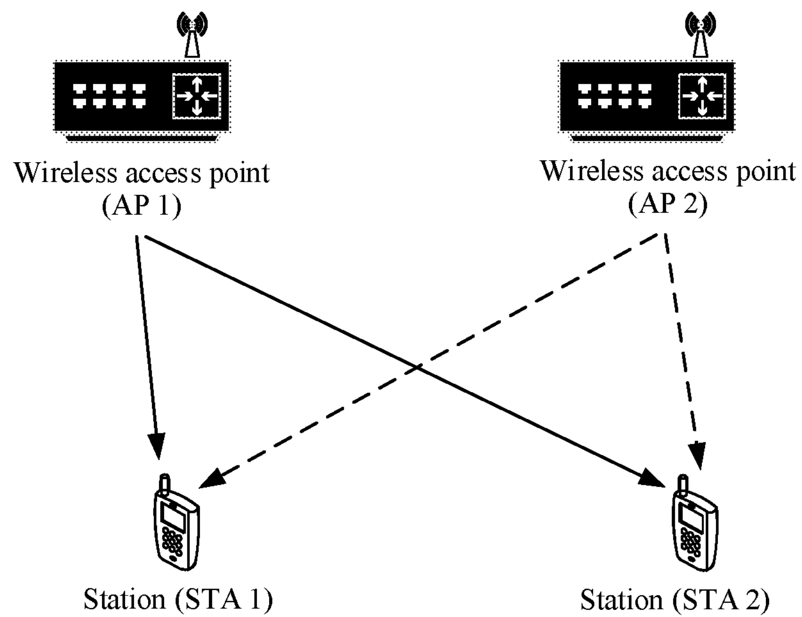
FIG. 2 is a schematic diagram of data transmission performed by a plurality of intra-frequency deployed APs according to an embodiment of this application.

For ease of understanding, refer to FIG. 2. FIG. 2 is a schematic diagram of data transmission performed by an AP 1 and an AP 2 that are intra-frequency deployed. The AP 1 and AP 2 that are intra-frequency deployed means that only the AP 1 or the AP 2 can send a packet. It may also be understood that although both the AP 1 and the AP 2 send packets, the AP 2 cannot communicate with a STA 2, because radio channel energy sent by the AP 1 covers the STA 2. Similarly, radio channel energy sent by the AP 2 covers a STA 1. As a result, the AP 1 cannot communicate with the STA 2. In FIG. 2, solid lines indicate that the AP communicates with the STA, and dashed lines indicate that the AP cannot communicate with the STA. FIG. 2 shows an example in which the AP 1 communicates with the SAT 1 and the STA, and the AP 2 does not communicate with the STA 2.

To improve a network transmission rate, the AP 1 and AP 2 may be allowed to concurrently send data. However, it needs to be ensured that the STA 1 is not interfered by a signal sent by the AP 2, and the STA 2 is not interfered by a signal sent by the AP 1. In some embodiments, interference between the AP 1 and the AP 2 may be prevented in an interference nulling mode. Interference nulling means that the AP (the AP 1) obtains a channel of a STA (the STA 1) associated with the AP (the AP 1) and a channel of a STA (the STA 2) associated with another intra-frequency AP (the AP 2), and cancels interference from the STA 2 through precoding, so that the AP 1 and the AP 2 can concurrently transmit data without interfering with each other. In this way, the AP 1 and the AP 2 can concurrently transmit data, and a transmission rate of an entire network can be improved.

Figure 3:
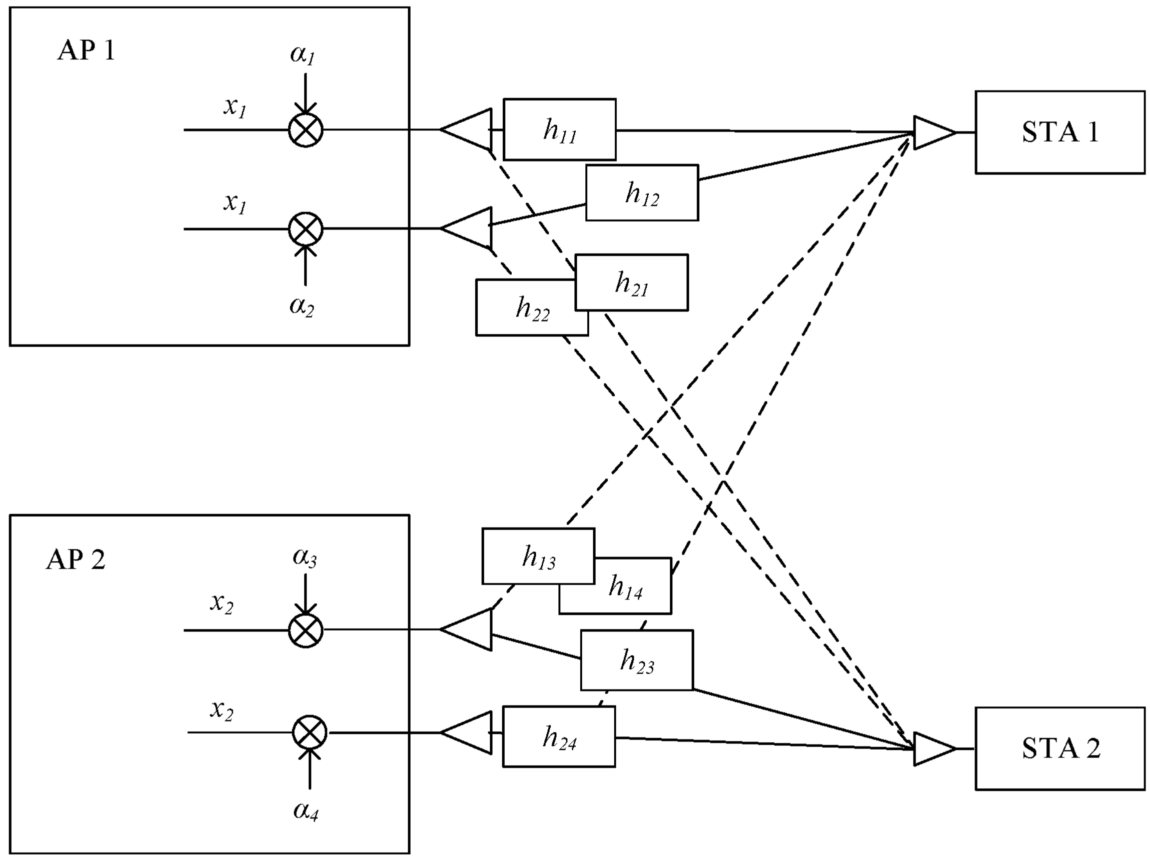
FIG. 3 is a schematic diagram of a model of data transmission performed by a plurality of intra-frequency deployed APs through interference nulling according to an embodiment of this application.

For ease of understanding, the following uses FIG. 3 as an example to describe a specific principle of interference nulling. FIG. 3 shows an example in which two adjacent intra-frequency APs are an AP 1 and an AP 2. A STA associated with the AP 1 is a STA 1, and a STA associated with the AP 2 is a STA 2. When the AP 1 and the AP 2 separately send data to the STAs associated with the AP 1 and the AP 2, because a radio channel is broadcast, both the STA 1 and the STA 2 receive the data from the AP 1 and the AP 2. In this case, mutual interference is likely to occur, in other words, the STA 1 and the STA 2 cannot normally receive the data of the APs associated with the STA 1.

It is assumed that a signal received by the STA 1 may be denoted as:

$$y_1=a_1h_{11}x_1+a_2h_{12}x_1+a_3h_{13}x_2+a_4h_{14}x_2 \quad (1);$$

$y_1$ is the signal received by the STA 1, $a_1$ and $a_2$ respectively indicate precoding coefficients of an AP 1, $a_3$ and $a_4$ respectively indicate precoding coefficients of an AP 2, $h_{11}$ and $h_{12}$ are channels between the AP 1 and the STA 1, $h_{13}$ and $h_{14}$ are channels between the AP 2 and a STA 2, $x_1$ indicates to-be-sent data of the AP 1, and $x_2$ indicates to-be-sent data of the Ap 2.

If $a_3h_{13}x_2+a_4h_{14}x_2=0$ in formula (1), in other words, $$\alpha_3=-\frac{h_{14}}{h_{13}}\alpha_4,$$

a requirement of interference nulling can be met, to be specific, the signal $y_1$ received by the STA 1 is not interfered by channels $h_{13}$ and $h_{14}$.

Similarly, it is assumed that a signal received by the STA 2 may be denoted as:

$$y_2=a_1h_{21}x_1+a_2h_{22}x_1+a_3h_{23}x_2+a_4h_{24}x_2 \quad (2);$$

$y_2$ is a signal received by the STA 2, $a_1$ and $a_2$ respectively indicate precoding coefficients of an AP 1, $a_3$ and $a_4$ respectively indicate precoding coefficients of an AP 2, $h_{21}$ and $h_{22}$ are channels between the AP 1 and the STA 2, $h_{23}$ and $h_{24}$ are channels between the AP 2 and a STA 2, $x_1$ indicates to-be-sent data of the AP 1, and $x_2$ indicates to-be-sent data of the AP 2.

If $a_1h_{21}x_1+a_2h_{22}x_1=0$ in formula (1), in other words, $$\alpha_1=-\frac{h_{21}}{h_{22}}\alpha_2,$$

a requirement of interference nulling can be met, to be specific, the signal $y_2$ received by the AP 2 is not interfered by channels $h_{21}$ and $h_{22}$.

It can be learned that to prevent mutual interference between a plurality of intra-frequency deployed APs in an interference nulling mode, channel sounding needs to be performed across APs. To be specific, each AP in the plurality of intra-frequency deployed APs not only needs to obtain a channel of a STA associated with the AP, but also needs to obtain a channel of a STA not associated with the AP.

The 802.11 standard supports implicit channel sounding (which may also be referred to as transparent channel sounding) and explicit channel sounding. Implicit channel sounding means that the AP performs channel sounding on a channel sounding frame, for example, a null data packet (NDP) frame, reported by the STA associated with the AP, and the STA does not perform channel sounding. Explicit channel sounding means that the AP sends a channel sounding frame to the STA, and the STA performs sounding on the channel sounding frame, and sends an obtained channel sounding result to the AP. This specification mainly focuses on explicit channel sounding. Therefore, implicit channel sounding is not further described herein.

Figure 4:
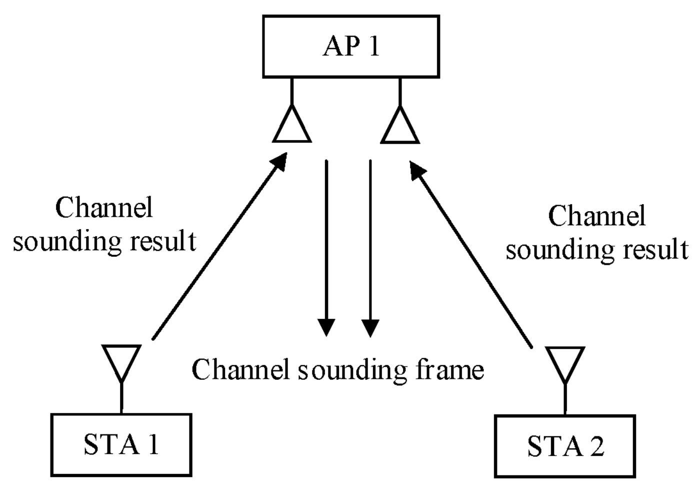
FIG. 4 is a schematic flowchart of explicit channel sounding according to an embodiment of this application.

FIG. 4 shows a schematic flowchart of explicit channel sounding. An AP (for example, an AP 1 in FIG. 4) may send a channel sounding frame to one or more STAs (for example, a STA 1 and a STA 2 in FIG. 4) associated with the AP. The one or more STAs (for example, the STA 1 and the STA 2) perform sounding on the received channel sounding frame, obtain a channel result, and feed back the channel result to the AP (AP 1) associated with the STAs.

Figure 5:
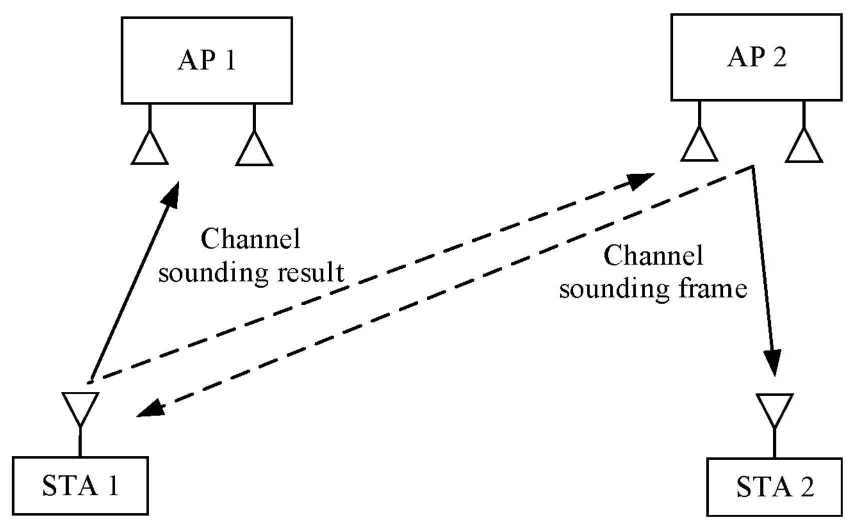
FIG. 5 is a schematic diagram of a principle that two intra-frequency deployed APs cannot separately obtain channel sounding results of STAs not associated with the two APs according to an embodiment of this application.

However, in an application scenario of two intra-frequency deployed adjacent APs as shown in FIG. 5, an AP 2 sends a channel sounding frame to a STA 1 (a STA associated with an AP 1), and the STA 1 identifies that a source address of the channel sounding frame is not an address of the AP 1 associated with the STA 1. Therefore, the STA 1 refuses to parse the channel sounding frame, and does not perform channel sounding on the channel sounding frame. Similarly, after performing channel sounding on the received channel sounding frame, the STA 1 feeds back a channel sounding result to the AP 1 and the AP 2. The AP 2 identifies that a destination address of the channel sounding result is not an address of the AP 2, refuses to parse the channel sounding result, and cannot obtain the channel sounding result of the STA 1. Therefore, as shown in FIG. 5, the channel sounding frame and the channel sounding result between the AP 2 and the STA 1 are indicated by dashed lines, to indicate that the AP 2 and the STA 1 do not parse a packet (the channel sounding frame or the channel sounding result) that does not belong to the STA 1 and the AP 2 respectively. In addition, even if the AP 2 parses the channel sounding result from the STA 1, because some parameters of the channel sounding result match the AP 1, the AP 2 cannot successfully parse the channel sounding result, in other words, cannot obtain the channel sounding result of the STA 1. It can be learned that in a scenario of a plurality of intra-frequency deployed APs, a single-AP explicit channel sounding method is still used, and channel sounding cannot be performed across APs, in other words, the AP 2 cannot perform channel sounding on the STA 1 associated with the AP 1.

Therefore, an embodiment of this application provides a channel sounding method. In the method, the AP 2 may masquerade as the AP 1, and perform channel sounding on a plurality of STAs that are not associated with the AP 2. The AP 1 may forward received channel sounding results of STAs that do not belong to the AP 1 to the AP 2, to perform channel sounding across APs.

The technical solutions provided in embodiments of this application are described below in detail with reference to the accompanying drawings.

Figure 6A:
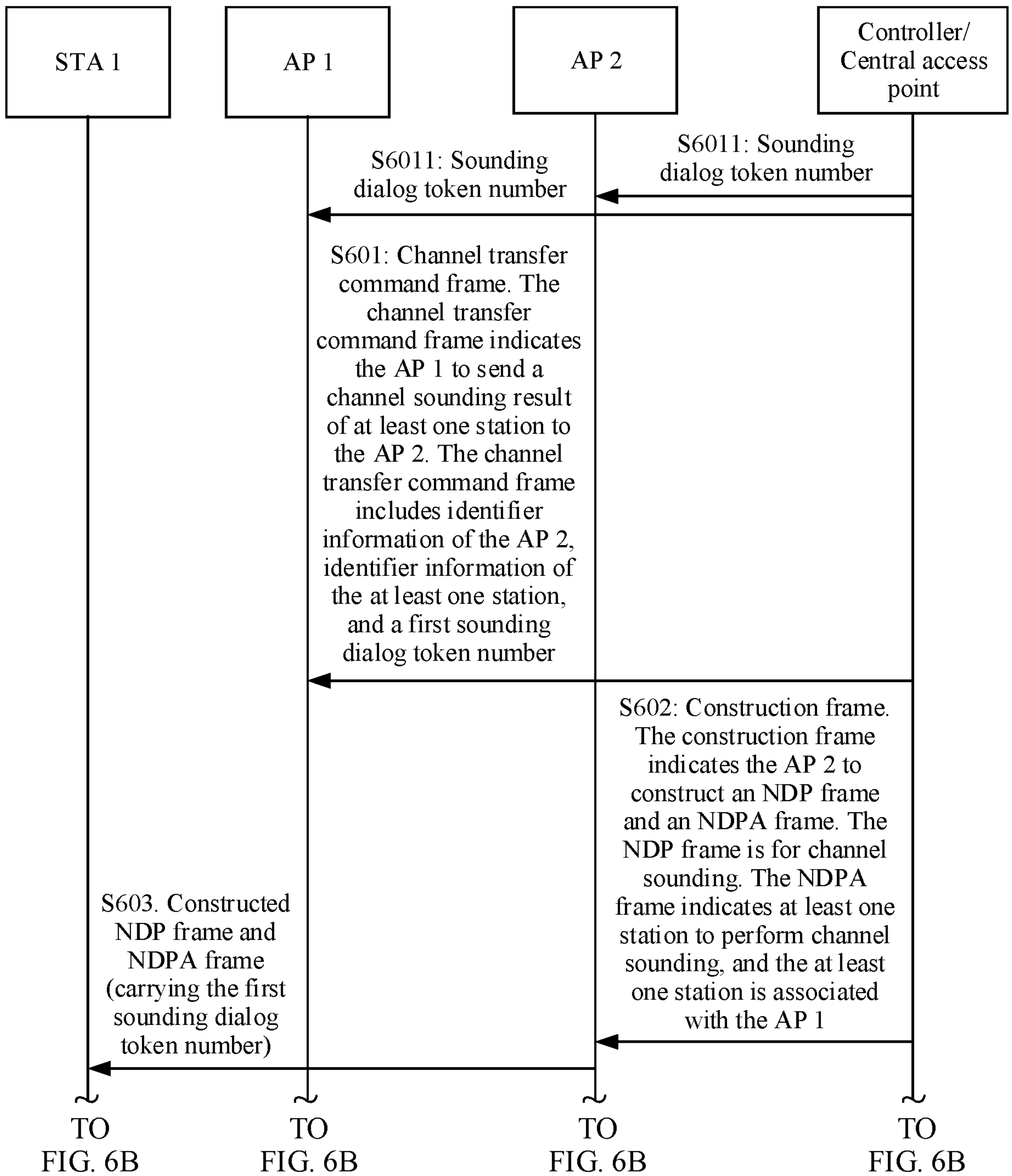
FIG. 6A and FIG. 6B are a schematic flowchart of a channel sounding method according to an embodiment of this application.
Figure 6B:
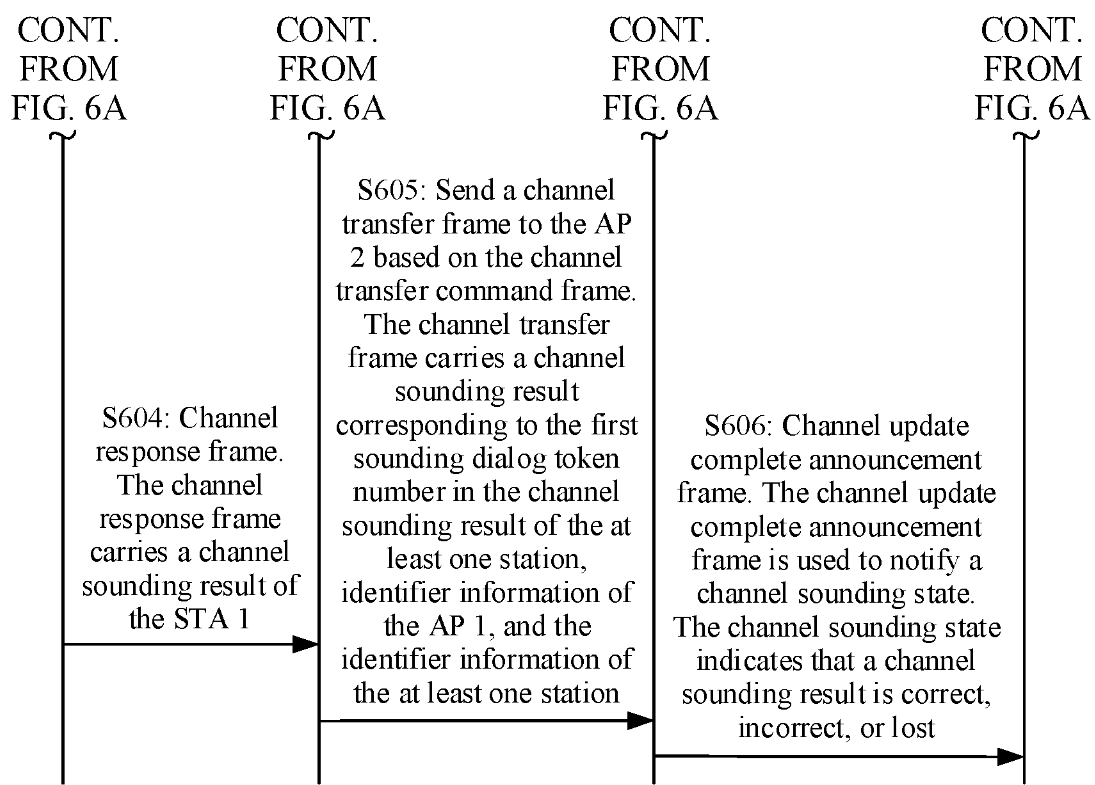

FIG. 6A and FIG. 6B show a channel sounding method according to an embodiment of this application. The following describes an example in which the method provided in this embodiment of this application is applied to the application scenario shown in FIG. 1. In addition, the method may be executed by two communication apparatuses. The two communication apparatuses are, for example, a first access point (denoted as an AP 1 below) and a second access point (denoted as an AP 2 below). It should be noted that the method is also applicable to a network including at least three APs. A specific quantity of APs is not limited in this embodiment of this application. Each AP may be associated with one STA, or may be associated with a plurality of STAs. The following uses an example in which the AP 1 is associated with one STA (denoted as a STA 1 below) and the AP 2 is associated with one STA (denoted as a STA 2 below). It should be understood that the STA 1 is not associated with the AP 2. Similarly, the STA 2 is not associated with the AP 1.

Specifically, a procedure of the channel sounding method according to this embodiment of this application is described as follows.

S601: A controller or a central access point sends a channel transfer command frame to the AP 1. The channel transfer command frame may indicate the AP 1 to send a channel sounding result of at least one station to the AP 2. The channel transfer command frame includes identifier information of the AP 2, identifier information of the at least one station, and a first sounding dialog token number.

In this embodiment of this application, the controller may be responsible for coordinating a plurality of APs to perform channel sounding, data transmission, and the like. The controller may be connected to one or more APs through a network cable or an optical fiber, or the controller may be wirelessly connected to one or more APs. In some embodiments, the controller may be disposed in the AP and used as a functional module of the AP. For example, the controller may be disposed in the AP 1, and interaction between the controller and the AP 1 may be considered as internal information exchange. For example, that the controller sends the channel transfer command frame to the AP 1 may be considered as that the controller sends a channel transfer command to the AP 1. The channel transfer command is used to indicate the AP 1 to send channel sounding information of the at least one station to the AP 2. The controller is disposed in the AP 1, and may also be considered as a central access point of the AP 1. Certainly, the controller may alternatively be independent of the AP 1. Specific implementation of the controller is not limited in this embodiment of this application. The following description uses an example in which the controller sends the channel transfer command frame to the AP 1.

It should be understood that the at least one station is associated with the AP 1 and is not associated with the AP 2. The following uses an example in which the at least one station is one station and the station is the STA 1. Because the STA 1 is associated with the AP 1 and is not associated with the AP 2, a destination address carried in a channel sounding result sent by the STA 1 is the address of the AP 1, and the AP 2 receives and determines that the destination address carried in the channel sounding result is not the address of the AP 2, and discards the channel sounding result. Alternatively, even if the AP 2 parses the channel sounding result, because some parameters of the channel sounding result match the AP 1, the AP 2 cannot successfully parse the channel sounding result, in other words, the AP 2 cannot obtain the channel sounding result of the STA 1.

Therefore, to enable the AP 2 to obtain the channel sounding result of the STA 1, in this embodiment of this application, the AP 1 may be indicated to forward a channel sounding result of a station that does not belong to the AP 1 to the AP 2. It should be understood that the channel sounding result of the station that does not belong to the AP 1 herein means a channel sounding result that is not required by the AP 1 but required by another AP in channel sounding results reported by a plurality of stations associated with the AP 1 to the AP 1, for example, a channel sounding result required by the AP 2. For example, the channel sounding result may be channel sounding results of some stations in the plurality of stations, or may be channel sounding results of all stations.

For example, in this embodiment of this application, the controller or the central access point may send the channel transfer command frame to the AP 1. The channel transfer command frame may carry a destination address or a destination address index, in other words, indicate the AP 1 to send a channel sounding result to an AP corresponding to the destination address. For example, the channel transfer command frame may include identifier information of the AP 2, to indicate the AP 1 to forward the channel sounding result to the AP 2. The identifier information of the AP 2 may be an ID of the AP 2, an MAC address of the AP 2, an IP address of the AP 2, or the like. A specific implementation of the identifier information of the AP 2 is not limited in this embodiment of this application.

The channel transfer command frame further includes identifier information of the at least one station. The at least one station is associated with the AP 1 but is not associated with the AP 2. The identifier information of the station may be an ID of the station, an MAC address of the station, or an IP address of the station. This is not limited in this embodiment of this application.

If the channel transfer command frame includes identifier information of a plurality of stations, the AP 2 needs to obtain channel sounding results of a plurality of STAs. However, the AP 1 can receive a channel sounding result of only one station at one time. Therefore, when the AP 1 determines that the channel transfer command frame includes the identifier information of the plurality of STAs, the AP 1 may send a channel report poll (beamforming report poll, BFRP) frame to at least one station associated with the AP 1, to successively obtain the channel sounding results of the plurality of stations. It should be understood that the BFRP frame carries a station list. The station list includes the identifier information of the plurality of STAs. After receiving the BFRP frame, the plurality of STAs associated with the AP 1 may determine, based on the station list carried in the BFRP, whether to send the channel sounding results to the AP 1. If the identifier information of the station carried in the BFRP is consistent with the identifier of the station, the channel sounding result is sent to the AP 1. This is repeated for a plurality of times, and the AP 1 may obtain a channel sounding result sent by the at least one STA.

It should be understood that a network includes a plurality of APs, and each AP is associated with a plurality of STAs. In this case, a plurality of STAs report channel sounding results to the AP, and the AP 2 may need channel sounding results of some STAs in the plurality of STAs. Similarly, the AP 1 receives channel sounding results separately sent by a plurality of stations associated with the AP 1, to obtain a plurality of channel sounding results. In the plurality of channel sounding results, some channel sounding results may belong to the AP 1, and some channel sounding results may belong to the AP 2. The AP 1 needs to know to which AP some or all of the channel sounding results should be forwarded.

To enable the AP 1 to distinguish whether the received channel sounding results belong to the AP 1, in this embodiment of this application, different identifier information may be pre-allocated to the AP 1 and the AP 2. In this way, the channel sounding results reported by the stations associated with the AP 1 may carry the identifier information, and the AP 1 may determine, based on the identifier information carried in the received channel sounding results, whether the channel sounding results belong to the AP 1. In addition, the channel transfer command frame sent by the controller or the central access point to the AP 1 may also carry the identifier information, to notify the AP 1 of a specific AP to which the channel sounding results that do not belong to the AP 1 are forwarded.

It should be noted that the identifier information intends to distinguish a specific AP from which a packet comes or a specific AP to which the packet belongs. For example, the identifier information may alternatively be a sounding dialog token number, or may be other information that can be used to distinguish a specific AP to which a packet exchanged between the AP 1 and the AP 2 belongs. This is not limited in this embodiment of this application. The following uses an example in which the identifier information is the sounding dialog token number.

For example, when sending a channel sounding result, the STA 1 may also send a sounding dialog token number corresponding to the channel sounding result. In other words, the channel sounding result sent by the STA 1 carries the sounding dialog token number. The AP 1 compares whether the sounding dialog token number carried in the received channel sounding result is consistent with a sounding dialog token number allocated to the AP 1. If they are consistent, the AP 1 may determine that the channel sounding result belongs to the AP 1. If they are inconsistent, the AP 1 may compare whether the sounding dialog token number carried in the channel sounding result is consistent with a sounding dialog token number carried in the channel transfer command frame. If they are inconsistent, the channel sounding result does not belong to the AP 1, and the AP 1 may determine to forward the channel sounding result to an AP corresponding to the sounding dialog token number in the channel transfer command frame.

Due to a plurality of APs in the network, each AP is associated with a plurality of STAs. Each AP may need to obtain a channel sounding result of one or more STAs associated with the AP, or may need to obtain a channel sounding result of one or more STAs not associated with the AP; or may need to obtain both the channel sounding result of the one or more STAs associated with the AP and the channel sounding result of the one or more STAs not associated with the AP. The AP may classify the STAs associated with the AP into one channel sounding group, and classify STAs associated with another AP into another channel sounding group. To determine a specific channel sounding group for each sounding, the channel transfer command frame may further include a field (which may be referred to as a channel sounding number field) used to carry a channel sounding group number (NDPA sounding group number).

It should be understood that the channel sounding group number may be considered as an identifier used to distinguish between different channel sounding groups. For example, in some embodiments, in one or more channel sounding processes, the channel sounding group number carried in the channel transfer command frame may be one channel sounding group number, or may be a plurality of same channel sounding group numbers, indicating that the AP 2 needs to obtain channel sounding results of a plurality of STAs belonging to a same channel sounding group. Alternatively, in one or more channel sounding processes, a channel sounding group number carried in an NDPA-NDP construction frame may be a plurality of different channel sounding group numbers. The different channel sounding group numbers correspond to different channel sounding groups, indicating that the AP 2 needs to obtain channel sounding results of a plurality of STAs belonging to the different channel sounding groups. Alternatively, in one or more channel sounding processes, the channel transfer command frame carries a plurality of channel sounding group numbers that can distinguish different times of channel sounding.

Figure 7:
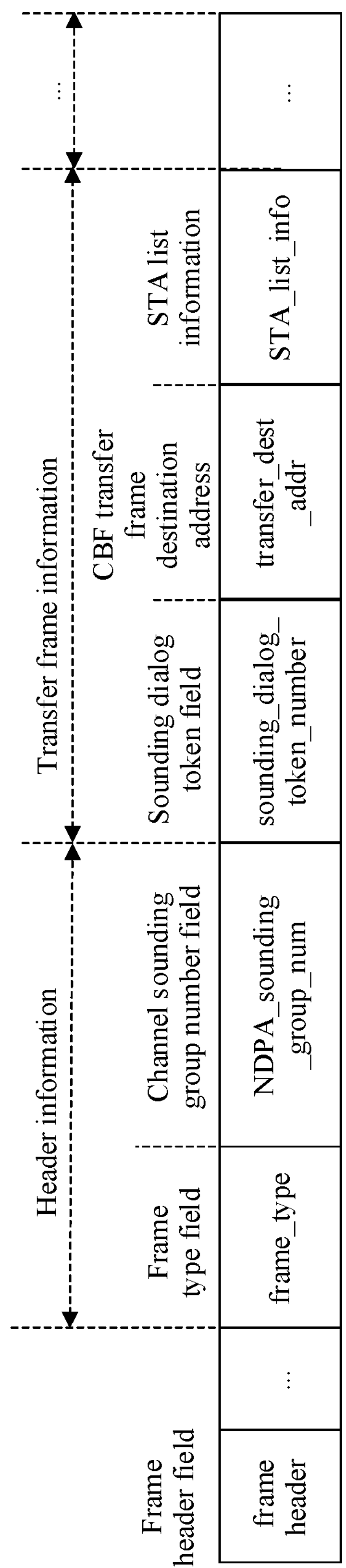
FIG. 7 is a schematic diagram of a structure of a construction frame according to an embodiment of this application.

As an example of the channel transfer command frame, FIG. 7 is a schematic diagram of a structure of the channel transfer command frame. The channel transfer command frame includes a frame header (which may be denoted as frame header) field, a frame type (which may be denoted as frame_type) field, and a channel sounding group number (which may be denoted as NDPA_sounding_group_num) field. The channel transfer command frame further includes a CBF transfer frame destination address (transfer_dest_addr) field, used to carry an address of an AP 2 or an index identifying the address of the AP 2. The channel transfer command frame further includes a STA list information (which may be denoted as STA_list_info) field, used to carry, for example, an identifier of a STA. Certainly, the channel transfer command frame further includes a sounding dialog token number (sounding dialog token number) field used to carry a sounding dialog token number. The sounding dialog token number field indicates that when a sounding dialog token number in a channel sounding result received by the AP 1 is the same as the sounding dialog token number in the channel transfer command frame, information about the CBF transfer frame destination address field in the frame needs to be encapsulated into a channel transfer frame and forwarded. The sounding dialog token number field, the CBF transfer frame destination address (transfer_dest_addr) field, and the STA list information (which may be denoted as STA_list_info) field all carry transfer frame information in the channel transfer command frame. Accordingly, the frame type field and the channel sounding group number field may be considered as carrying header information of the channel transfer command frame. It should be noted that a function of the channel transfer command frame is to indicate to transfer the channel sounding result. A name of the channel transfer command frame is not limited in this embodiment of this application. In other words, in some other embodiments, the channel transfer command frame may have another name.

The STA list information field may include information about one STA or information about a plurality of STAs. If the STA list information field includes the information about the plurality of STAs, in other words, the AP 2 needs to obtain channel sounding results of a plurality of STAs. However, the AP 1 can receive a channel sounding result of only one station at one time. Therefore, when the AP 1 determines that the STA list information field of the channel transfer command frame includes information about the plurality of STAs, the AP 1 may send a channel report poll (beamforming report poll, BFRP) frame to at least one station associated with the AP 1, to successively obtain a channel sounding result of the at least one station. It should be understood that the BFRP frame carries a station list. The station list includes identifier information of the at least one STA. After receiving the BFRP frame, the plurality of STAs associated with the AP 1 may determine, based on the station list carried in the BFRP, whether to send the channel sounding results to the AP 1. If the identifier information of the station carried in the BFRP is consistent with the identifier of the station, the channel sounding result is sent to the AP 1. This is repeated for a plurality of times, and the AP 1 may obtain a channel sounding result sent by the at least one STA.

S6011: The controller or the central access point separately sends a sounding dialog token number to the AP 1 and the AP 2. The sounding dialog token number may be used to distinguish whether a channel sounding result received by the AP 1 belongs to the AP 1 or the AP 2.

The controller or the central access point may pre-allocate different sounding dialog token numbers to different APs. In this way, the AP 1 may determine, based on the sounding dialog token number carried in the channel sounding result and the sounding dialog token number carried in the channel transfer command frame, a specific AP to which the received channel sounding result belongs, and further forward the received channel sounding result to the corresponding AP. The following describes several possible allocation manners in which the controller or the central access point allocates the sounding dialog token number to the AP.

Allocation manner 1: Different sounding dialog token numbers are allocated to different APs at a granularity of an AP.

For example, a sounding dialog token number allocated by the controller or the central access point to the AP 1 is a number 1, and a sounding dialog token number allocated by the controller or the central access point to the AP 2 is a number 2. For example, a channel transfer command frame sent by the controller or the central access point to the AP 1 carries the sounding dialog token number 2. The AP 1 may determine, based on the channel transfer command frame, a channel sounding result of an associated station to be sent to the AP 2. A channel sounding result sent by the STA 1 carries a sounding dialog token number 2, which is different from the sounding dialog token number 1 allocated to the AP 1. The AP 1 may determine that the channel sounding result does not belong to the AP 1. Further, the AP 1 determines that the sounding dialog token number 2 carried in the channel sounding result sent by the STA 1 is consistent with the sounding dialog token number 2 carried in the channel transfer command frame. Then, the AP 1 may determine that the channel sounding result of the STA 1 belongs to the AP 2, in other words, the channel sounding result of the STA 1 needs to be forwarded to the AP 2.

For another example, the controller or the central access point may allocate a plurality of sounding dialog token numbers to the AP 1, or may allocate a plurality of sounding dialog token numbers to the AP 2, provided that the sounding dialog token numbers allocated to the AP 1 and the AP 2 are different. This is simple. For example, the controller or the central access point may allocate the sounding dialog token numbers 1, 2, and 3 to the AP 1, and may allocate the sounding dialog token numbers 4, 5, and 6 to the AP 2.

In this allocation manner, only one sounding dialog token dialog number needs to be allocated to one AP, so that a sounding dialog token number resource can be saved. In addition, when the sounding dialog token numbers are limited, it is more flexible.

In addition, this allocation manner may be used for each channel sounding, to be specific, the controller or the central access point allocates different sounding dialog token numbers to the AP 1 and the AP 2 in each channel sounding. When each channel sounding is completed, the controller or the central access point retrieves the sounding dialog token numbers allocated in the channel sounding, in other words, repeatedly uses the sounding dialog token numbers, so that a sounding dialog token number resource can be further saved.

Allocation manner 2: Different sounding dialog token numbers are allocated to both a plurality of STAs associated with a same AP and a plurality of STAs not associated with the AP at a granularity of a STA group. Different sounding dialog token numbers are allocated to different APs.

It should be understood that, for one AP, both STAs associated with the AP and STAs not associated with the AP exist. In this embodiment of this application, a group of sounding dialog token numbers may be allocated to the STAs associated with the AP, and a group of sounding dialog token numbers may be allocated to the plurality of STAs not associated with the AP. It should be understood that the plurality of STAs not associated with the AP are associated with another AP. In this allocation manner, two groups of sounding dialog token numbers are allocated to the AP. For ease of description, the following uses an example in which a first group of sounding dialog token numbers are allocated to STAs associated with a specific AP and a second group of sounding dialog token numbers are allocated to STAs not associated with the AP.

The first group of sounding dialog token numbers may include one or more sounding dialog token numbers, and the second group of sounding dialog token numbers may also include one or more sounding dialog token numbers. The sounding dialog token numbers included in the first group of sounding dialog token numbers is different from the sounding dialog token numbers included in the second group of sounding dialog token numbers.

For example, for the AP 1, the first group of sounding dialog token numbers may include one sounding dialog token number (for example, 1), and the second group of sounding dialog token numbers may also include one sounding dialog token number (for example, 2). For the AP 2, the first group of sounding dialog token numbers may include one sounding dialog token number (for example, 3), and the second group of sounding dialog token numbers may also include one sounding dialog token number (for example, 4).

For example, for the AP 1, the first group of sounding dialog token numbers may include two sounding dialog token numbers (for example, 1 and 2), and the second group of sounding dialog token numbers may also include two sounding dialog token numbers (for example, 3 and 4). For the AP 2, the first group of sounding dialog token numbers may include one sounding dialog token number (for example, 5), and the second group of sounding dialog token numbers may also include one sounding dialog token number (for example, 6). Alternatively, the first group of sounding dialog token numbers may include two sounding dialog token numbers (for example, 5 and 6), and the second group of sounding dialog token numbers may also include two sounding dialog token numbers (7 and 8).

Similar to the allocation manner 1, the allocation manner 2 may also be used for each channel sounding, to be specific, the controller or the central access point allocates different sounding dialog token numbers to the AP 1 and the AP 2 in each channel sounding. When each channel sounding is completed, the controller or the central access point retrieves the sounding dialog token numbers allocated in the channel sounding, in other words, repeatedly uses the sounding dialog token numbers, so that a sounding dialog token number resource can be also saved as much as possible.

S602: The controller or the central access point sends a construction frame to the AP 2. The construction frame indicates the AP 2 to construct an NDP frame and an NDPA frame. The NDP frame is for channel sounding. The NDPA frame indicates at least one station to perform channel sounding, and the at least one station is associated with the AP 1.

The controller may be disposed in the AP and used as a functional module of the AP. For example, the controller may be disposed in the AP 2, and interaction between the controller and the AP 2 may be considered as internal information exchange. For example, the controller sending the construction frame to the AP 2 may be considered as that the controller sends a construction command to the AP 2. The construction command indicates the AP 2 to construct the NDPA frame and the NDP frame. The controller is disposed in the AP 1, and may also be considered as a central access point of the AP 1. Certainly, the controller may alternatively be independent of the AP 2. Specific implementation of the controller is not limited in this embodiment of this application. The following description uses an example in which the controller sends the construction frame to the AP 2.

It should be understood that the at least one station is associated with the AP 1 and is not associated with the AP 2. The following uses one station STA 1 as an example for description. A case of a plurality of stations is similar, and details are not described again. In some embodiments, because the STA 1 is not associated with the AP 2, the STA 1 receives a channel sounding frame from the AP 2, the STA 1 identifies that a source address (namely, the address of the AP 2) of the channel sounding frame is not the address of the AP 1 associated with the STA 1, and the STA 1 refuses to parse the channel sounding frame, discards the received channel sounding frame, and does not perform channel sounding on the channel sounding frame.

Therefore, in this embodiment of this application, if the AP 2 needs to obtain the channel sounding result of the STA 1, the AP 2 may masquerade as the AP 1, and send the channel sounding frame to the STA 1. In this way, when receiving the channel sounding frame, the STA 1 considers that the channel sounding frame is a channel sounding frame sent by the AP 1, and the STA 1 performs sounding on the channel sounding frame, and then feeds back the obtained channel sounding result to the AP 1. Therefore, the AP 2 can obtain the channel sounding result of the STA 1.

Therefore, in a possible implementation, the controller may indicate the AP 2 to masquerade as the AP 1 and send the channel sounding frame to the STA 1. For example, the controller may send the construction frame to the AP 2. The construction frame may indicate the AP 2 to construct a channel sounding frame used for channel sounding, and construct an announcement frame used to notify a specific STA that performs channel sounding. The channel sounding frame may be a dedicated frame used for channel sounding, or may reuse a data frame or a control frame with another function, provided that the data frame or the control frame can be used for channel sounding. Embodiments of this application uses an example in which the channel sounding frame is a null data packet (NDP) frame.

In addition to the STA 1, there may be a plurality of STAs associated with the AP 1. Therefore, the AP 2 may need to obtain channel sounding results of the plurality of STAs associated with the AP 1. In this case, the AP 2 needs to masquerade as the AP 1 to send the NDP frame to the plurality of STAs associated with the AP 1, and needs to indicate a specific STA that is associated with the AP 1 and that needs to perform channel sounding. Therefore, the construction frame may indicate the AP 2 to construct the announcement frame used to notify the specific STA that performs channel sounding. The announcement frame may be a null data packet announcement (NDPA) frame. The NDPA frame may indicate the STA associated with the AP 1 to perform channel sounding.

To be specific, the construction frame indicates the AP 2 to construct the NDPA frame and the NDP frame. In other words, the construction frame may indicate the AP 2 to construct a frame sequence that is to be sent to the STA 1 and that is used for channel sounding. Because the construction frame indicates the AP 2 to construct the NDPA frame and the NDP frame, in some embodiments, the construction frame may also be referred to as an "NPDA-NDP construction frame". Certainly, a specific name of the construction frame is not limited in this embodiment of this application.

After constructing the NDPA and NDP frames based on the construction frame, AP 2 sends the NDPA frame and the NDP frame. If the NDPA frame indicates the STA 1 to perform channel sounding, when receiving the NDP frame from the AP 2, the STA 1 performs channel sounding on the NDP frame. Then, the STA 1 feeds back a channel sounding result to the AP 1. However, the AP 1 cannot determine whether the channel sounding result belongs to the AP 1, to be specific, the channel sounding result may belong to the AP 1, or may belong to another AP. If the channel sounding result sent by the STA 1 belongs to the AP 1, the AP 1 updates a channel of the STA 1. If the channel sounding result does not belong to the AP 1, the AP 1 forwards the channel sounding result to another AP. To enable the AP 1 to distinguish whether the channel sounding result sent by the STA 1 associated with the AP 1 is required by the AP 1, in this embodiment of this application, the channel sounding result sent by the STA 1 may identify a specific NDP frame of the AP from which the channel sounding result is obtained. The AP 1 may determine, by identifying a specific NDP frame on which channel sounding is performed to obtain the channel sounding result sent by the STA 1, whether the channel sounding result belongs to the AP 1.

Therefore, similar to the channel transfer command frame, in this embodiment of this application, the construction frame sent by the controller or the central access point to the AP 2 includes a sounding dialog token number allocated to the AP 2. A specific AP from which an NDP frame comes is distinguished by using the sounding dialog token number.

For example, an NDPA-NDP construction frame may include a plurality of fields, and the plurality of fields may be used to carry information required for constructing the NDP frame and the NDPA frame. For example, the plurality of fields include a field used to carry NDP frame information (which may be referred to as an NDP frame information field), a field used to carry NDPA frame information (which may be referred to as an NDPA frame information field), a field used to carry a sounding dialog token number (which may be referred to as a sounding dialog token number field) allocated to the AP 2, and the like.

It should be understood that the NDPA-NDP construction frame further includes a frame type field used to distinguish a frame type, and some necessary information required for transmitting frame data. The necessary information may be encapsulated in one field (which may be referred to as a frame header field in this specification). A frame header format may be a frame header format agreed upon by both communication parties. This is not limited in this embodiment of this application. The frame type field may indicate a type of data carried in the NDPA-NDP construction frame, and is used to distinguish the NDPA-NDP construction frame from another frame.

The NDP frame information field carries necessary information required for constructing the NDP frame. The NDPA frame information field may carry information about a STA indicated by the NDPA frame, for example, identifier information of the STA, a response type of a channel sounding result fed back by the STA, and a quantity of streams (for example, the quantity of streams is 1, 2, or 3). The NDPA frame information field may further carry necessary information for constructing the NDPA frame in addition to the STA information, for example, common information about the NDPA frame, and identifier information used to identify the NDPA frame, for example, an allocated sounding dialog token number.

Due to a plurality of APs in the network, each AP is associated with a plurality of STAs. Each AP may need to obtain a channel sounding result of one or more STAs associated with the AP, or may need to obtain a channel sounding result of one or more STAs not associated with the AP; or may need to obtain both the channel sounding result of the one or more STAs associated with the AP and the channel sounding result of the one or more STAs associated with the AP. The AP may classify the STAs associated with the AP into one channel sounding group, and classify one or more STAs associated with another AP into another channel sounding group. To determine a specific channel sounding group for each sounding, the NDPA-NDP construction frame may further include a field (which may be referred to as a channel sounding number field) used to carry a channel sounding group number (NDPA sounding group number).

It should be understood that the channel sounding group number may be considered as an identifier used to distinguish between different channel sounding groups. For example, in some embodiments, in one or more channel sounding processes, the channel sounding group number carried in the NDPA-NDP construction frame may be one channel sounding group number, or may be a plurality of same channel sounding group numbers, indicating that the AP 2 needs to obtain channel sounding results of a plurality of STAs belonging to a same channel sounding group. Alternatively, in one or more channel sounding processes, a channel sounding group number carried in the NDPA-NDP construction frame may be a plurality of different channel sounding group numbers. The different channel sounding group numbers correspond to different channel sounding groups, indicating that the AP 2 needs to obtain channel sounding results of a plurality of STAs belonging to the different channel sounding groups. Alternatively, in a plurality of channel sounding processes, t the NDPA-NDP construction frame carries a plurality of channel sounding group numbers that can distinguish different times of channel sounding.

Figure 8:
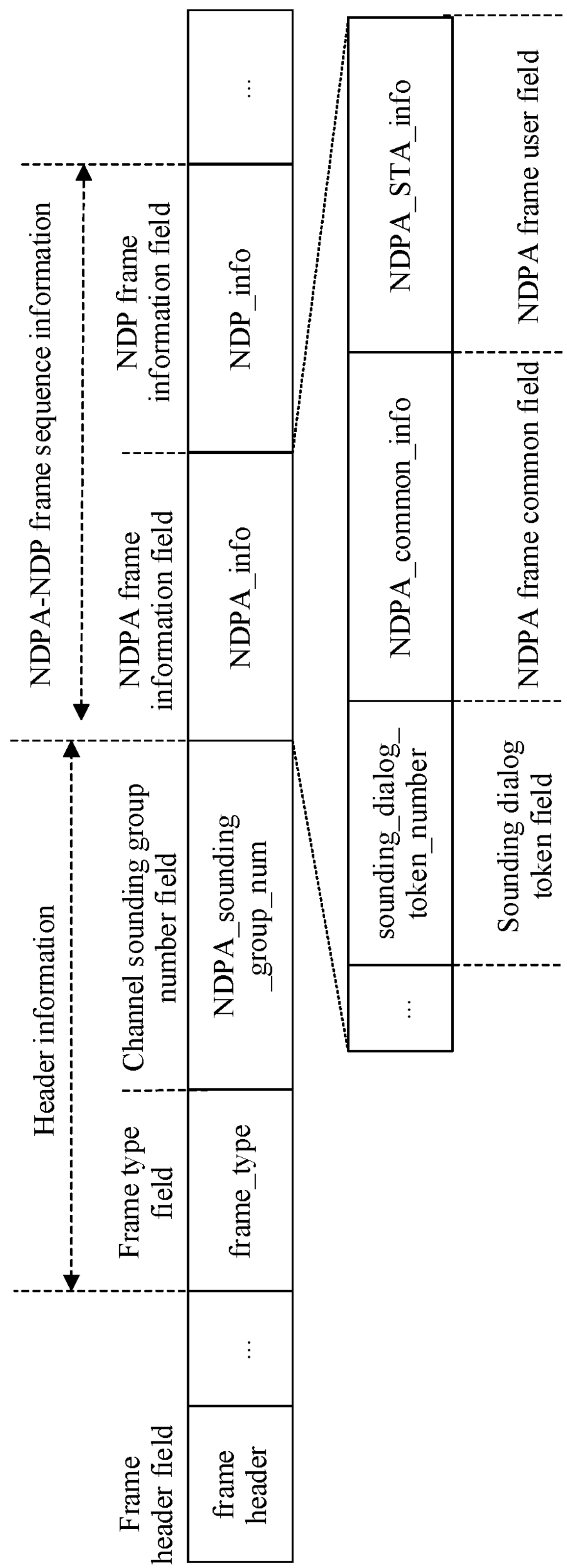
FIG. 8 is a schematic diagram of a structure of an NDPA frame in the 802.11 standard.

In some embodiments, the NDPA-NDP construction frame may use structural designs of an NDPA frame and an NDP frame that are specified in the 802.11 standard. For example, FIG. 8 is a schematic diagram of a structure of an NDPA-NDP construction. The NDPA-NDP construction frame includes a frame header (which may be denoted as frame header) field, a frame type (which may be denoted as frame_type) field, and a channel sounding group number (which may be denoted as NDPA_sounding_group_num) field, an NDPA frame information (which may be denoted as NDPA_info) field, and an NDP frame information (which may be denoted as NDP_info) field. Compared with the NDPA frame information field and the NDP frame information field, the frame type field and the channel sounding group number field may be considered as being used to carry header information of the NDPA-NDP construction frame. The NDPA frame information field and the NDP frame information field are used to carry NDPA-NDP frame sequence information. It should be understood that the NDPA-NDP frame sequence information includes NDPA frame sequence information and NDP frame sequence information.

FIG. 8 uses an example in which the NDPA frame information field includes a field carrying NDPA common information (which may be briefly referred to as an NDPA frame common field and referred to as NDPA_common_info), a field carrying STA information (which may be briefly referred to as an NDPA frame user field and referred to as NDPA_STA_info), and a field carrying a sounding dialog token number (referred to as sounding_dialog_token_number).

Figure 9:
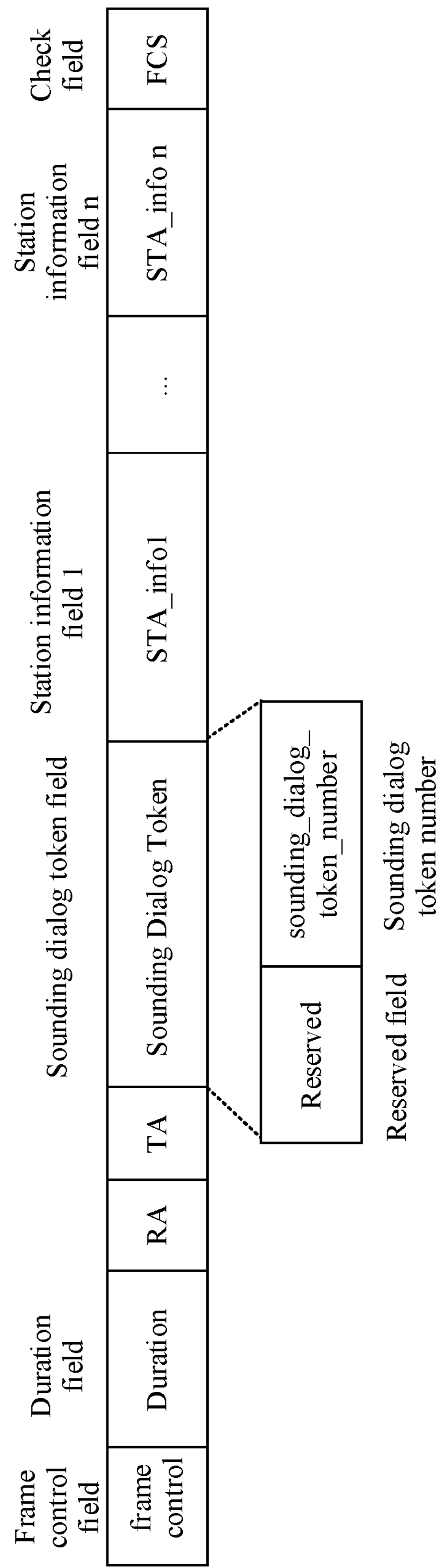
FIG. 9 is a schematic diagram of a structure of an NDP frame in the 802.11 standard.

It should be understood that the NDPA frame information field may further include another possible field. FIG. 9 is a possible schematic diagram of a structure of an NDPA frame format. For example, the NDPA frame information field may further include a receiver address (receiver address) (denoted as RA) field, a transmitter address (denoted as TA) field, and a sounding dialog token field (including a sounding dialog token number field and a reserved field). The sounding dialog token field shown in FIG. 8 may use the sounding dialog token field shown in FIG. 9.

Figure 10:
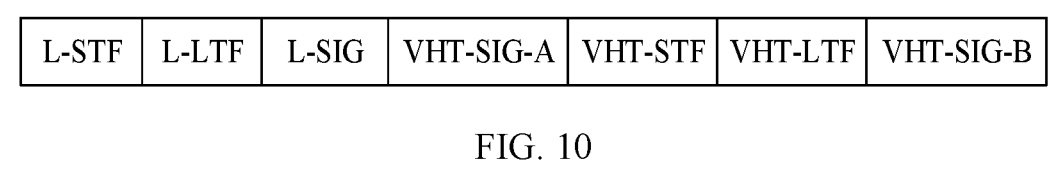

The NDP frame information field may be in a format shown in FIG. 10. The NDP frame information field includes a legacy short training field (L-STF), a legacy long training field (L-LTF) field, a legacy signal field (L-SIG), a very high throughput signal A field (VHT-SIG-A), a very high throughput short training field (L-STF), a very high throughput long training field (VHF-LTF), a very high throughput signal B field (VHT-SIG-B), and the like.

In this embodiment of this application, the controller may directly send the NDPA-NDP construction frame shown in FIG. 8 to the AP 2. In an alternative implementation, in some other embodiments, the NDPA-NDP construction frame shown in FIG. 8 may be pre-stored in the AP 2, and the controller may send, to the AP 2, an index that identifies the NDPA-NDP construction frame. For example, the AP 1 and the AP 2 may synchronize information about associated STAs. In this way, most content in the NDPA frame is the same as that in the NDP frame. In this case, information required for constructing the NDPA-NDP construction frame may be pre-stored in the AP 2, and the controller only needs to notify the AP 2 of a specific STA whose channel sounding result is to be obtained. The AP 2 may generate the NDPA frame and the NDP frame based on a STA indicated by the controller and the prestored NDPA-NDP construction frame.

It should be noted that a sequence of performing S601 and S602 is not limited in this embodiment of this application. In other words, S601 may be performed before S602, or may be performed after S602. After the controller performs S601 and S602, the AP 2 may construct, based on the allocated sounding dialog token number and the NPDA-NDP construction frame, an NDP frame and an NDPA frame that are to be sent to the STA 1.

S603: The AP 2 sends the constructed NDPA frame and NDP frame to the STA 1, and the STA 1 receives the NDPA frame and the NDP frame.

After constructing the NDPA and NDP frames based on the NPDA-NDP construction frame, the AP 2 may send the constructed NDPA frame and NDP frame to the STA 1. The AP 2 may separately send the NDPA frame and the NDP frame to the STA 1. For example, the AP 2 may first send the NDPA frame to the STA 1, and then send the NDP frame to the STA 1.

It should be understood that the AP 2 may broadcast the NDPA frame and the NDP frame, and a plurality of STAs including the STA 1 receive the NDPA frame. Each STA may determine, based on identifier information of a STA carried in the NDPA frame, whether channel sounding needs to be performed. If the identifier information of the STA carried in the NDPA frame is the same as the identifier information of the STA, the STA may perform channel sounding on the received NDP frame. If the identifier information of the STA carried in the NDPA frame is different from the identifier information of the STA, the STA may not perform channel sounding on the received NDP frame. In other words, the STA 1 determines, based on the identifier information of the STA carried in the NDPA frame, to perform channel sounding on the received NDP frame.

S604: The STA 1 sends a channel response frame to the AP 1. The channel response frame carries a channel sounding result of the STA 1.

After receiving the NDP frame, the STA 1 performs channel sounding on the received NDP frame, and sends the obtained channel sounding result to the AP 1. Specifically, the STA 1 may send the channel response frame (it can also called compressed beamforming frame, CBF) to the AP 1, where the CBF carries the channel sounding result of the STA 1.

The AP 1 receives the CBF from the STA 1. The channel sounding result carried in the CBF may belong to the AP 1, or may belong to the AP 2. Therefore, the AP 1 may determine whether the channel sounding result belongs to the AP 1. The AP 1 does not know whether the AP 2 needs to obtain the channel sounding result of the STA 1 associated with the AP 1. Therefore, if the AP 2 does not need to obtain the channel sounding result of the STA 1, and the AP 1 receives the channel sounding result sent by the STA 1, and determines, by default, whether the channel sounding result belongs to the AP 1, which greatly increases load of the AP 1.

Therefore, in this embodiment of this application, only after receiving the channel transfer command frame sent by the controller or the central access point, the AP 1 determines a specific AP to which the received channel sounding result is forwarded.

S605: The AP 1 sends a channel transfer frame to the AP 2 based on the channel transfer command frame. The channel transfer frame carries a channel sounding result corresponding to the first sounding dialog token number in the channel sounding result of the at least one station, identifier information of the AP 1, and the identifier information of the at least one station.

The AP 1 may send, to the AP 2 in a manner of sending the channel transfer frame to the AP 2, the channel sounding result corresponding to the first sounding dialog token number in the received channel sounding result. It should be understood that the channel transfer frame carries the channel sounding result corresponding to the first sounding dialog token number, further carries the identifier information of the AP 1, used to identify a specific AP that receives the channel sounding result, and carries the identifier information of the at least one STA, used to identify a specific STA of the channel sounding result.

Figure 11:
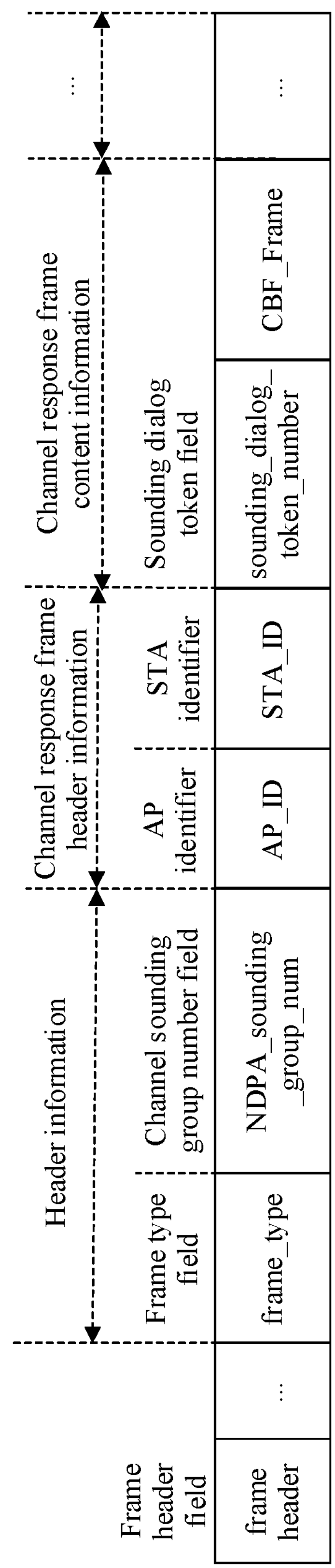
FIG. 11 is a schematic diagram of a structure of a channel transfer frame according to an embodiment of this application.

As an example of the channel transfer frame, FIG. 11 is a schematic diagram of a structure of the channel transfer frame according to an embodiment of this application. The channel transfer frame may be considered as a group of frames related to the channel transfer command frame shown in FIG. 10. The channel transfer frame may encapsulate, based on information in the channel transfer command frame, a channel response frame that is in received channel response frames and that corresponds to the first sounding dialog token number, and forward an encapsulated channel response frame to an AP specified by the channel transfer command frame, for example, the AP 2. Similar to that shown in FIG. 7, the channel transfer command frame includes a frame header field, a frame type field, and a channel sounding group number field. The channel transfer frame further includes header information of the channel response frame, for example, indicates an identifier of a specific AP (AP ID) that receives the channel response frame encapsulated in the frame, and indicates an identifier of a specific STA (STA ID) that sends the channel response frame encapsulated in the frame. It should be understood that the AP identifier may be an ID of the AP, or may be a MAC address or an IP address of the AP. Similarly, the STA identifier may be an ID of the STA, a MAC address or an IP address of the STA, or may be an identifier that is used to identify an association identifier (AID) of a STA associated with an AP and that can identify an identity of the STA. The channel transfer frame further includes content information of the CBF, for example, data in the CBF (carried in the CBF_Frame field in FIG. 11) and a sounding dialog token number, used to identify an object to which the CBF belongs (carried in the "sounding dialog token number field" in FIG. 11). Certainly, the channel transfer frame may further include another possible field, and no example is given herein. It should be noted that, if the AP identifier may be obtained from, for example, a frame header of the channel transfer frame, an AP identifier field does not need to be additionally set. In addition, the channel transfer frame may have another name in some embodiments. In other words, a specific name of the channel transfer command frame is not limited in this embodiment of this application.

It should be understood that the AP 1 may receive CBFs separately sent by a plurality of stations, and each CBF includes a channel sounding result of each station. Some channel sounding results in channel sounding results of the plurality of stations may belong to the AP 1, or may belong to the AP 2. Therefore, before forwarding the channel sounding results, the AP 1 may determine whether the channel sounding results belong to the AP 1. If the AP 1 determines that the channel sounding result sent by the STA 1 belongs to the AP 1, the AP 1 may update a channel. If the AP 1 determines that the channel sounding result sent by the STA 1 does not belong to the AP 1, the AP 1 may forward the channel sounding result to another AP.

In some embodiments, the AP 1 may determine, based on the sounding dialog token number carried in the channel sounding result, to forward the channel sounding result to the AP 2. Channel sounding results separately sent by the plurality of stations associated with the AP 1 further carry a sounding dialog token number used to identify the NDPA frame. The AP 1 may compare whether a sounding dialog token number carried in a CBF is consistent with a sounding dialog number allocated to the AP 1. If they are consistent, the AP 1 may consider that a channel sounding result indicated by the CBF belongs to the AP 1. On the contrary, if the sounding dialog token number carried in the CBF is inconsistent with the sounding dialog number allocated to the AP 1, the AP 1 determines that the channel sounding result indicated by the CBF does not belong to the AP 1. Further, the AP 1 may determine that the sounding dialog token number carried in the CBF is the same as a sounding dialog token number allocated to a specific AP, and send the channel sounding result in the CBF to the corresponding AP. For example, if the AP 1 determines that a second sounding dialog token number carried in a CBF is the same as a first sounding dialog token number allocated to the AP 2, the AP 1 determines to send a channel sounding result in the CBF to the AP 2, to be specific, the AP 1 sends, to the AP 2, a channel sounding result corresponding to the first sounding dialog token number in the received channel sounding result of the at least one station.

In this embodiment of this application, channel sounding may be performed across APs by using the NDPA-NDP construction frame that carries the sounding dialog token number, the channel transfer command frame, the channel transfer frame, the channel response frame, and the like. The NDPA-NDP construction frame may be sent once to complete transmission of necessary information for a plurality of times of channel sounding. In this way, after completing channel sounding once, the AP can start next channel sounding without waiting as long as an air interface is idle. This can improve air interface utilization and channel sounding efficiency.

In some other embodiments, after the AP 1 receives channel response frames separately sent by the plurality of stations, if the AP 1 receives the channel transfer command frame sent by the controller or the central access point, the AP 1 may directly forward the received channel response frame to the AP 2. Compared with the foregoing embodiment, the AP 1 does not need to determine, based on the sounding dialog token number in the channel response frame, that a specific channel sounding result needs to be forwarded to the AP 2, and forwards the received channel sounding result as long as the AP 1 receives the channel transfer command frame.

In this manner, because the AP 1 does not need to determine, based on the sounding dialog token number, to which AP a channel sounding result of a specific station is to be forwarded, the channel transfer command frame sent by the controller to the AP 1 may not include the sounding dialog token number allocated to the AP 2, or may include the sounding dialog token number allocated to the AP 2. In other words, the channel transfer command frame may include the sounding dialog token number field, or may not include the sounding dialog token number field. In this way, a newly defined frame type may be used to identify a function of the channel transfer command frame, to be specific, indicating one AP to forward a received channel sounding result of a station.

It should be understood that, in this manner, the channel response frame, the channel transfer frame, and the channel update complete announcement frame may not include the sounding dialog token number field. Certainly, the channel response frame, the channel transfer frame, and the channel update complete announcement frame may also include the sounding dialog token number field. For example, if the channel response frame uses a design of the channel response frame in the 802.11n standard (in other words, not including the "sounding dialog token number field"), the channel response frame does not include the sounding dialog token number field. If the channel response frame uses a design of the channel response frame in the 802.11ac, 802.11ax, and subsequent 802.11 standards (in other words, including the "sounding dialog token number field"), the channel response frame includes the sounding dialog token number field. It should be understood that although the channel response frame includes the sounding dialog token number field, a function of the field is a function of the field specified in the 802.11ac, 802.11ax, and subsequent 802.11 standards.

S606: The AP 2 sends a channel update complete announcement frame to the controller or the central access point. The channel update complete announcement frame is used to notify a channel sounding state. The channel sounding state indicates that a channel sounding result is correct, incorrect, or lost.

After receiving the channel sounding result of the at least one STA forwarded by the AP 1, the AP 2 may send a channel update complete announcement frame to the controller or the central access point. The channel update complete announcement frame may be used to notify a channel sounding state, for example, a channel sounding result is correct, incorrect, or lost. In this way, the controller or the central access point determines whether channel sounding needs to be continued or data transmission needs to be performed.

Figure 12:
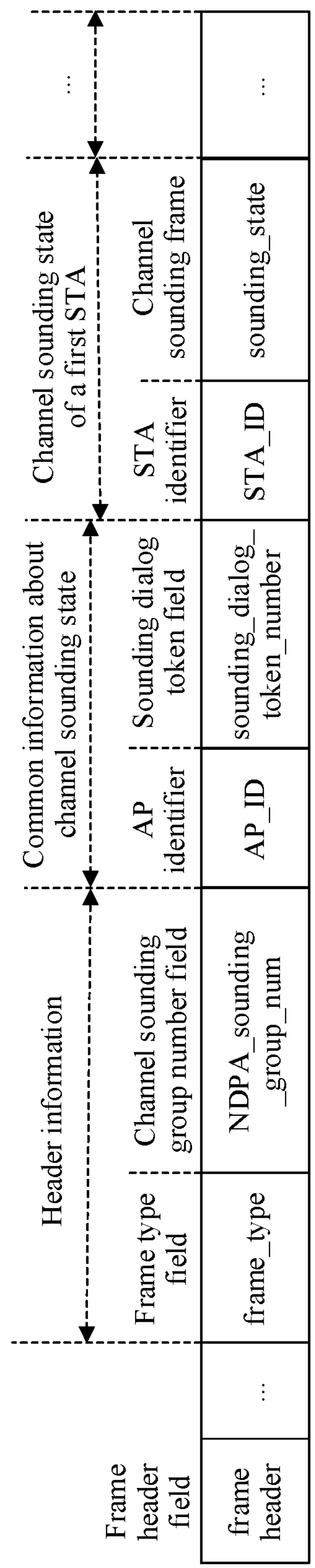
FIG. 12 is a schematic diagram of a structure of a channel update complete announcement frame according to an embodiment of this application.

As an example of the channel update complete announcement frame, FIG. 12 is a schematic diagram of a structure of the channel update complete announcement frame according to an embodiment of this application. Similar to the frame structure shown in FIG. 7, the channel update complete announcement frame includes a frame header field, and a frame type field and a channel sounding group number field that are used to carry a header channel. The channel update complete announcement frame further includes an AP identifier (AP ID) used to carry common information about channel sounding state and/or a sounding dialog token number (sounding dialog token number) field, indicating channel sounding performed on an AP to which the sounding dialog token number is allocated. The channel update complete announcement frame further includes a plurality of STA channel sounding state fields used to carry channel sounding states of the plurality of STAs. Each channel sounding state field of a STA may include a STA identifier (STA ID) and a corresponding channel sounding state field. The plurality of STAs may include a STA associated with an AP 2, or may include a STA not associated with the AP 2.

In this embodiment of this application, a controller may indicate the AP 2 to masquerade as an AP 1 and send a channel sounding frame to the plurality of stations associated with the AP 1, and the controller may also control the AP 1 to forward, to the AP 2, received channel sounding results sent by the plurality of stations. In this way, channel sounding is performed across APs, so that a plurality of intra-frequency deployed APs can concurrently send data, and a data transmission rate in an entire network is improved.

Figure 13:
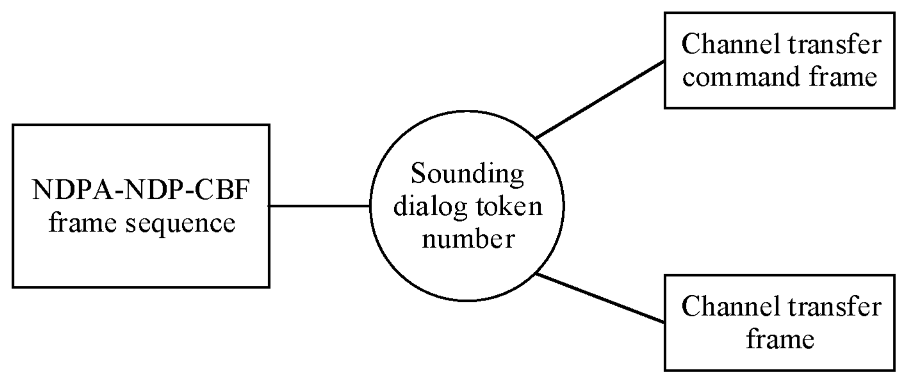
FIG. 13 is a schematic diagram of a principle that an AP implements a transfer mechanism according to an embodiment of this application.

Specifically, in this embodiment of this application, the sounding dialog token number may be used to distinguish whether a channel sounding result obtained by the AP is of an associated STA or an unassociated STA. In other words, as shown in FIG. 13, in this embodiment of this application, an inter-AP channel response frame may be forwarded by using an NDPA-NDP construction frame that carries the sounding dialog token number, a channel transfer command frame, a channel transfer frame, a channel response frame, and the like, so that channel sounding is performed across APs.

Figure 14:
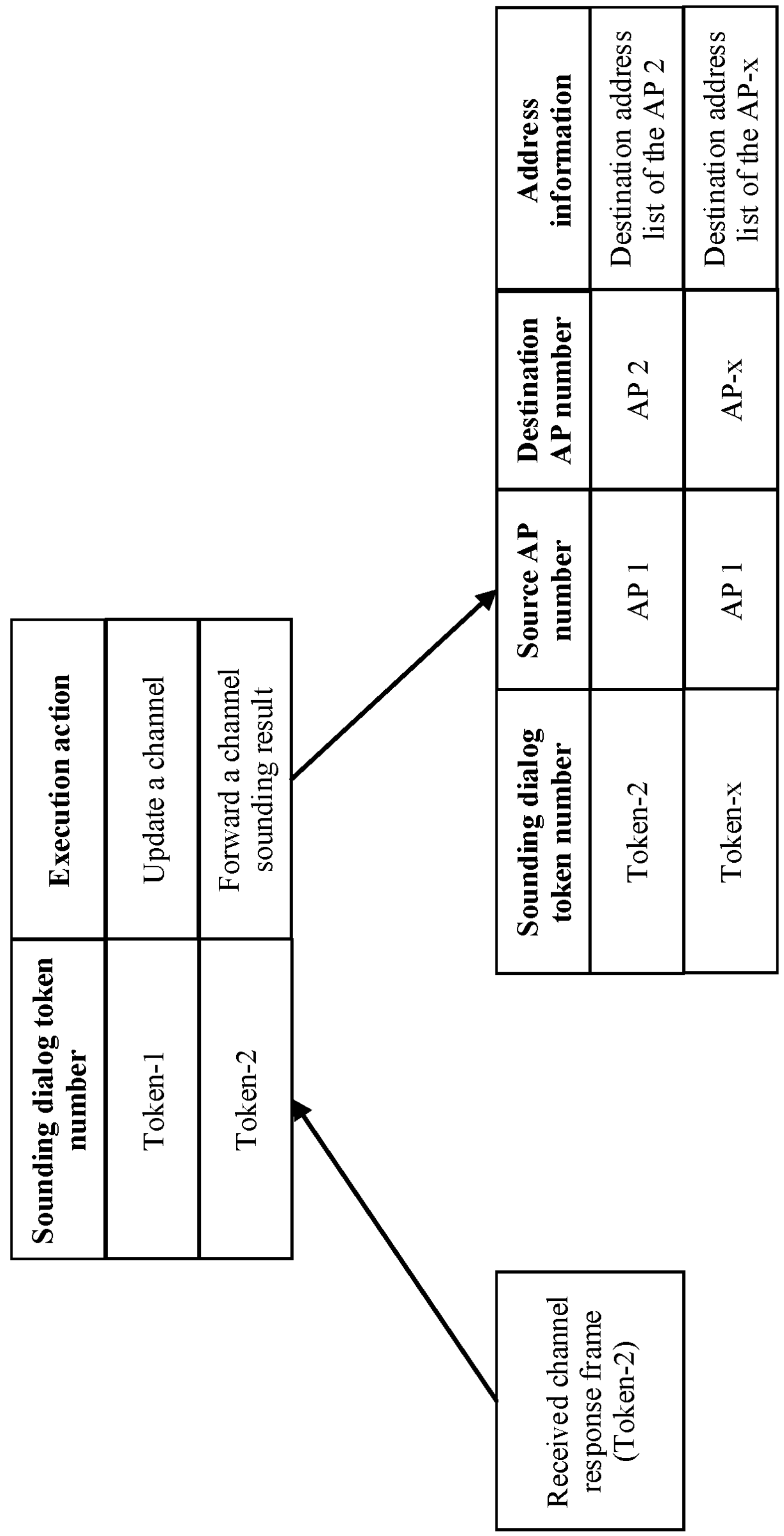
FIG. 14 is a schematic diagram of a transfer mechanism of an AP 1 based on a sounding dialog token number according to an embodiment of this application.

For example, the foregoing manner 1 of allocating the sounding dialog token number is used as an example. As shown in FIG. 14, a sounding dialog token number allocated by the controller to the AP 1 is, for example, token-1, a sounding dialog token number allocated to the AP 2 is token-2, and a sounding dialog token number allocated to the APx is token-x. During channel sounding across APs, for example, the AP 1 receives the channel response frame, and a sounding dialog token number carried in the channel response frame is token-2. The AP 1 may determine, based on token-2, that a channel sounding result in the channel response frame does not belong to the AP 1, but belongs to the AP 2. In other words, the AP 1 determines, based on token-2, to forward the channel sounding result in the received channel response frame instead of updating a channel. The AP 1 may determine, based on token-2, that a source address and destination address list of a channel transfer frame need to be encapsulated for forwarding the channel sounding result, and the AP 1 encapsulates the channel transfer frame, and sends an encapsulated channel transfer frame to the AP 2.

Figure 15:
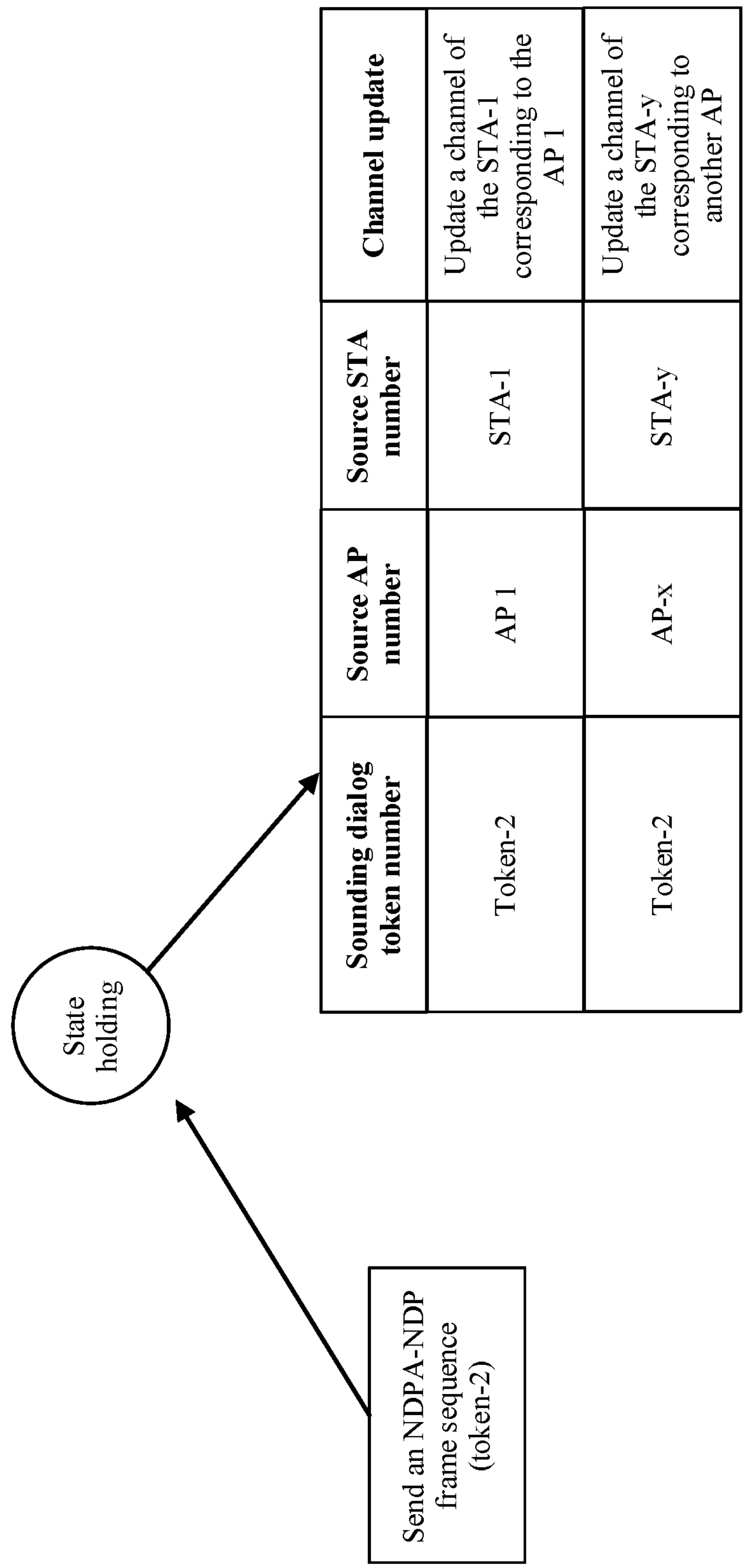
FIG. 15 is a schematic diagram of a transfer mechanism of an AP 2 based on a sounding dialog token number according to an embodiment of this application.

As shown in FIG. 15, an AP 2 masquerades as an AP 1 and sends an NDPA-NDP frame sequence, where the NDPA frame sequence may carry token-2, and then the AP 2 enters a state holding phase. The AP 2 may perform another function in the state holding phase. When the AP 2 receives a channel transfer frame sent by the another AP, the AP 2 may determine, based on token-2, identifier information of the AP, and identifier information of a STA that are carried in the channel transfer frame, to update a channel of a corresponding STA of a specific AP, to complete channel sounding across APs.

It should be noted that, the foregoing embodiment uses only two APs as an example to describe a cross-AP channel sounding process. It should be understood that the method is also used in a network including at least three APs, and any two APs in the at least three APs are the foregoing AP 1 and AP 2.

In the foregoing embodiment of this application, the method provided in this embodiment of this application is described separately from perspectives of an AP, a STA, and interaction between an AP and a STA. To implement functions in the method provided in the foregoing embodiment of this application, the network device and the terminal may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

The following describes a communication apparatus for implementing the foregoing method in this embodiment of this application with reference to the accompanying drawings. Therefore, all the foregoing content may be used in the following embodiments. Repeated content is not described again.

Figure 16:
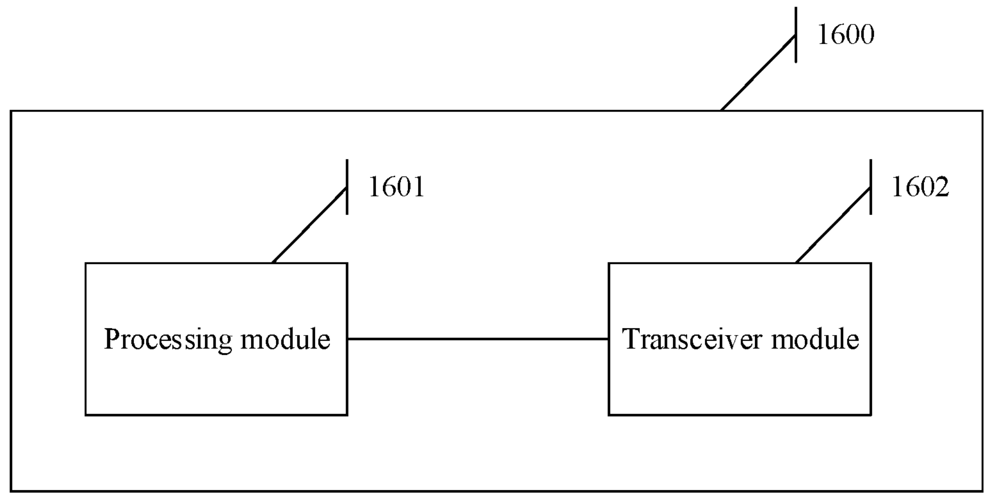
FIG. 16 is a schematic diagram of a structure of a communication apparatus according to an embodiment of this application.

FIG. 16 is a schematic diagram of a structure of a communication apparatus 1600. The communication apparatus 1600 may correspondingly implement functions or steps of an AP 1 or an AP 2 in the method embodiments. The communication apparatus may include a processing module 1601 and a transceiver module 1602, and optionally, may further include a storage module. The storage module may be configured to store instructions (code or a program) and/or data. The processing module 1601 and the transceiver module 1602 may be coupled to the storage unit. For example, the processing module 1601 may read the instructions (the code or the program) and/or the data in the storage unit, to implement a corresponding method. The foregoing modules may be disposed independently, or may be partially or totally integrated.

In some possible implementations, the communication apparatus 1600 can correspondingly implement behavior and functions of the first access point (the AP 1) in the foregoing method embodiments. For example, the communication apparatus 1600 may be the AP 1, or may be a component (for example, a chip or a circuit) used in the AP 1. The transceiver module 1602 may be configured to perform all receiving or sending operations performed by the AP 1 in the embodiment shown in FIG. 6A and FIG. 6B, for example, S6011, S601, S604, S605, and S606 in the embodiment shown in FIG. 6A and FIG. 6B, and/or configured to support another process of the technology described in this specification. The processing module 1601 is configured to perform all operations, other than the receiving and sending operations, performed by the AP 1 in the embodiment shown in FIG. 6A and FIG. 6B, and/or configured to support another process of the technology described in this specification.

In some embodiments, the transceiver module 1602 is configured to receive a channel transfer command frame from a controller or a central access point. The channel transfer command frame indicates the AP 1 to send a channel sounding result of at least one station to a second access point. The channel transfer command frame includes identifier information of the AP 2, identifier information of the at least one station, and a first sounding dialog token number. The at least one station is associated with the AP 1. The first sounding dialog token number is used by the AP 1 to identify whether the channel sounding result of the at least one station belongs to the AP 1. The processing module 1601 is configured to control, based on the channel transfer command frame, the transceiver module 1602 to send a channel transfer frame to the AP 2. The channel transfer frame carries a channel sounding result corresponding to the first sounding dialog token number in the channel sounding result of the at least one station, identifier information of the AP 1, and the identifier information of the at least one station.

In an optional implementation, the transceiver module 1602 is further configured to: before the AP 1 sends a channel transfer frame to the AP 2 based on the channel transfer command frame, receive channel response frames separately sent by a plurality of stations. The channel response frame includes a channel sounding result of each station and a second sounding dialog token number. The processing module 1601 is specifically configured to: when the second sounding dialog token number is different from a sounding dialog token number allocated to the AP 1, and the second sounding dialog token number is the same as the first sounding dialog token number, determine to send the channel transfer frame to the AP 2.

In an optional implementation, the processing module 1601 is specifically configured to: after receiving the channel transfer command frame, send the channel transfer frame to the AP 2.

In an optional implementation, the transceiver module 1602 is further configured to: send a BFRP frame to a plurality of stations associated with the AP 1, where the BFRP frame carries a station list, the station list includes the identifier information of the at least one station, and the BFRP frame is used to successively obtain the channel sounding result of the at least one station.

In an optional implementation, at least one sounding dialog token number allocated to the AP 1 is different from at least one sounding dialog token number allocated to the AP 2.

In an optional implementation, different sounding dialog token numbers correspond to different access points, and the first sounding dialog token number is one of the at least one sounding dialog token number allocated to the second access point.

In an optional implementation, a first channel sounding group and a second channel sounding group are allocated to the AP 1. The first channel sounding group includes one or more sounding dialog token numbers. The second channel sounding group includes one or more sounding dialog token numbers. The first channel sounding group corresponds to a station associated with the AP 1. The second channel sounding group corresponds to a station not associated with the AP 1.

In some possible implementations, the communication apparatus 1600 can correspondingly implement behavior and functions of the second access point (the AP 2) in the foregoing method embodiments. For example, the communication apparatus 1600 may be the AP 2, or may be a component (for example, a chip or a circuit) used in the AP 2. The transceiver module 1602 may be configured to perform all receiving or sending operations performed by the AP 2 in the embodiment shown in FIG. 6A and FIG. 6B, for example, S6011, S602, S606, and S607 in the embodiment shown in FIG. 6A and FIG. 6B, and/or configured to support another process of the technology described in this specification. The processing module 1601 is configured to perform all operations, other than the receiving and sending operations, performed by the AP 1 in the embodiment shown in FIG. 6A and FIG. 6B, and/or configured to support another process of the technology described in this specification.

In some embodiments, the transceiver module 1602 is configured to receive a construction frame from the controller or the central access point. The construction frame indicates the AP 2 to construct an NDP frame and an NDPA frame. The NDPA frame indicates at least one station to perform channel sounding. The NDP frame is for channel sounding. The at least one station is associated with the AP 2. The processing module 1601 is configured to construct the NDPA frame and the NDP frame based on the construction frame, and control the transceiver module 1602 to send the NDPA frame and the NDP frame to the at least one station. The transceiver module 1602 is further configured to receive a channel transfer frame sent by the AP 1. The channel transfer frame carries a channel sounding result corresponding to a first sounding dialog token. A channel sounding result of the at least one station is fed back by the at least one station to the AP 1. The first sounding dialog token is used to identify whether the channel sounding result of the at least one station belongs to the AP 2.

In an optional implementation, the construction frame includes NDPA information, NDP information, and a first sounding dialog token number allocated to the AP 2.

In an optional implementation, the processing module 1601 is specifically configured to generate the NDPA frame based on the first sounding dialog token number and the NDPA information, and generate the NDP frame based on the NDP information.

In an optional implementation, at least one sounding dialog token number allocated to the AP 2 is different from at least one sounding dialog token number allocated to the AP 1.

In an optional implementation, different sounding dialog token numbers correspond to different access points, and the first sounding dialog token number is one of the at least one sounding dialog token number allocated to the AP 2.

In an optional implementation, a first channel sounding group and a second channel sounding group are allocated to the AP 2. The first channel sounding group includes one or more sounding dialog token numbers. The second channel sounding group includes one or more sounding dialog token numbers. The first channel sounding group corresponds to a station associated with the AP 2. The second channel sounding group corresponds to a station not associated with the AP 2.

In an optional implementation, the transceiver module 1602 is further configured to send a channel update complete announcement frame to the controller or the central access point. The channel update complete announcement frame is used to notify a channel sounding state. The channel sounding state indicates that a channel sounding result is correct, incorrect, or lost.

It should be understood that, in this embodiment of this application, the processing module 1601 may be implemented as a processor or a processor-related circuit component, and the transceiver module 1602 may be implemented as a transceiver or a transceiver-related circuit component, or a communication interface.

Figure 17:
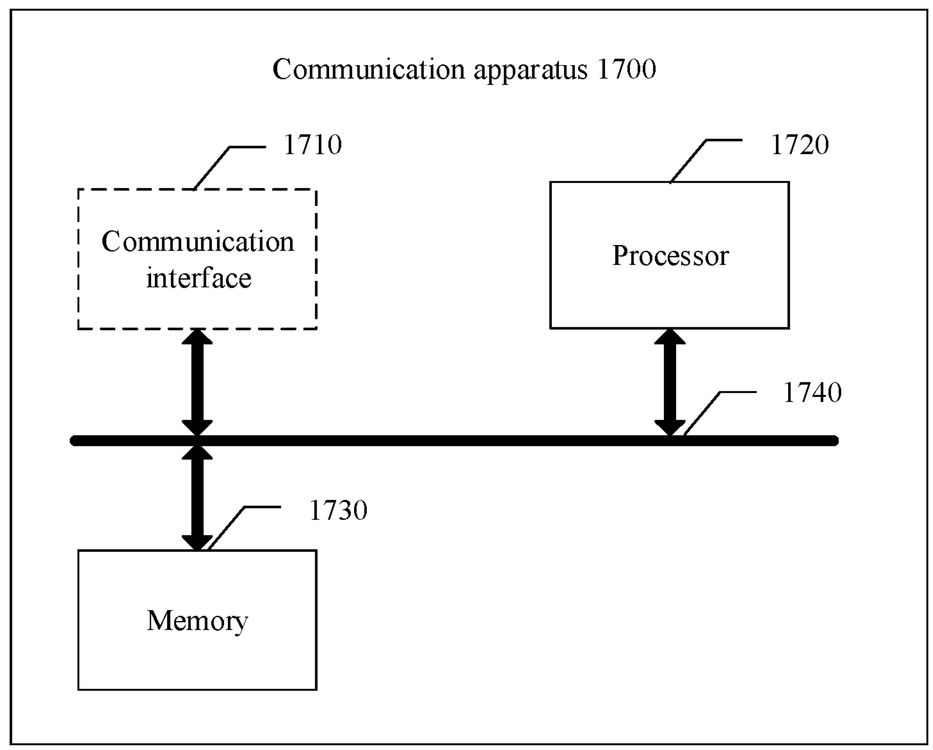
FIG. 17 is another schematic diagram of a structure of a communication apparatus according to an embodiment of this application.

FIG. 17 shows a communication apparatus 1700 according to an embodiment of this application. The communication apparatus 1700 may be an access point, and can implement a function of the first access point or the second access point in the methods provided in this embodiment of this application. Alternatively, the communication apparatus 1700 may be an apparatus that can support the first access point or the second access point in implementing a corresponding function in the methods provided in this embodiment of this application. The communication apparatus 1700 may be a chip system. In this embodiment of this application, the chip system may include a chip, or may include a chip and another discrete component.

In hardware implementation, the transceiver module 1602 may be a transceiver, and the transceiver is integrated into the communication apparatus 1700, to form a communication interface 1710.

The communication apparatus 1700 includes at least one processor 1720, configured to implement or support the communication apparatus 1700 in implementing a function of the first access point or the second access point in the methods provided in this embodiment of this application. For details, refer to detailed descriptions in the method example. Details are not described herein again.

The communication apparatus 1700 may further include at least one memory 1730, configured to store program instructions and/or data. The memory 1730 is coupled to the processor 1720. The coupling in this embodiment of this application may be an indirect coupling or a communication connection between apparatuses, units, or modules in an electrical form, a mechanical form, or another form, and is used for information exchange between the apparatuses, the units, or the modules. The processor 1720 may cooperate with the memory 1730. The processor 1720 may execute the program instructions and/or the data stored in the memory 1730, so that the communication apparatus 1700 implements a corresponding method. At least one of the at least one memory may be included in the processor.

The communication apparatus 1700 may further include the communication interface 1710, configured to communicate with another device by using a transmission medium, so that an apparatus used in the communication apparatus 1700 can communicate with the another device. For example, when the communication apparatus is the first access point, the another device is the second access point, a central access point, or a station. Alternatively, when the communication apparatus is the second access point, the another device is the first access point, a central access point, or a station. The processor 1720 may send and receive data through the communication interface 1710. The communication interface 1710 may be specifically a transceiver.

A specific connection medium between the communication interface 1710, the processor 1720, and the memory 1730 is not limited in this embodiment of this application. In this embodiment of this application, the memory 1730, the processor 1720, and the communication interface 1710 are connected through a bus 1740 in FIG. 17. The bus is represented by using a thick line in FIG. 17. A manner of a connection between other components is merely an example for description, and is not limited thereto. The bus may be classified into an address bus, a data bus, a control bus, and the like. For ease of representation, only one thick line is used to represent the bus in FIG. 17, but this does not mean that there is only one bus or only one type of bus.

In this embodiment of this application, the processor 1720 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in this embodiment of this application. The general purpose processor may be a microprocessor or any conventional processor or the like. The steps of the method disclosed with reference to this embodiment of this application may be directly performed by a hardware processor, or may be performed by using a combination of hardware in the processor and a software module.

In this embodiment of this application, the memory 1730 may be a non-volatile memory, such as a hard disk drive (HDD) or a solid-state drive (SSD), or may be a volatile memory, such as a random access memory (RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store the program instructions and/or the data.

It should be noted that the communication apparatus in the foregoing embodiment may be a terminal device, a circuit, or a chip used in the terminal device, or may be another combined component or component that has functions of the terminal device. When the communication apparatus is the terminal device, the transceiver unit may be a transceiver, and may include an antenna, a radio frequency circuit, and the like. The processing module may be a processor, for example, a central processing unit (CPU). When the communication apparatus is the component that has functions of the terminal device, the transceiver unit may be a radio frequency unit, and the processing module may be the processor. When the communication apparatus is the chip system, the transceiver unit may be an input/output interface of the chip system, and the processing module may be a processor of the chip system.

An embodiment of this application further provides a communication system. Specifically, the communication system includes a first access point, a second access point, and a station, or may further include more first access points and/or more second access points, and a plurality of stations. For example, the communication system includes the first access point and the second access point that are configured to implement related functions in FIG. 6A and FIG. 6B. Alternatively, the communication system includes the first access point, the second access point, and the station that are configured to implement related functions in FIG. 6A and FIG. 6B.

The first access point and the second access point are separately configured to implement functions of the network parts related to FIG. 6A and FIG. 6B. The station is configured to implement functions of the foregoing station related to FIG. 6A and FIG. 6B. For details, refer to the related descriptions in the method embodiment. Details are not described herein again.

An embodiment of this application further provides a computer-readable storage medium, including instructions. When the instructions are run on a computer, the computer performs the method performed by the first access point or the second access point in FIG. 6A and FIG. 6B; or when the instructions are run on a computer, the computer performs the method performed by the station in FIG. 6A and FIG. 6B.

An embodiment of this application further provides a computer program product, including instructions. When the computer program product runs on a computer, the computer is enabled to perform the methods performed by the first access point or the second access point in FIG. 6A and FIG. 6B. Alternatively, when the computer program product runs on a computer, the computer is enabled to perform the method performed by the station in FIG. 6A and FIG. 6B.

An embodiment of this application provides a chip system. The chip system includes a processor, and may further include a memory. The chip system is configured to implement functions of the first access point and the second access point in the foregoing methods, or is configured to implement functions of the first access point, the second access point, and the station in the foregoing methods. The chip system may include a chip, or may include a chip and another discrete component.

It should be understood that the terms "system" and "network" may be used interchangeably in embodiments of this application. "At least one" means one or more, and "a plurality of" means two or more. "And/or" describes an association relationship between associated objects, and indicates that three relationships may exist. For example, A and/or B may indicate the following three cases: A exists alone, both A and B exist, and B exists alone, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first access point and a second access point are merely intended to distinguish between different access points, but do not indicate that the two access points are different in a priority, a sending sequence, or importance.

It should be understood that the processor in embodiments of this application may be a CPU, or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

It should be noted that when the processor is a general purpose processor, a DSP, an ASIC, an FPGA or another programmable logic device, a discrete gate, a transistor logic device, or a discrete hardware component, the memory (a storage module) is integrated into the processor.

It should be noted that the memory described in this specification is intended to include but not limited to these memories and any memory of another proper type.

It should be understood that sequence numbers of the foregoing processes do not mean execution sequences in this embodiment of this application. The execution sequences of the processes should be determined based on functions and internal logic of the processes, and should not constitute any limitation on implementation processes of this embodiment of this application.

A person skilled in the art may be aware that units and algorithm steps in the examples described with reference to the embodiments disclosed in this specification can be implemented by electronic hardware or an interaction of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or other forms.

The units described as separate parts may or may not be physically separate. Parts displayed as units may or may not be physical units, and may be located in one position or may be distributed on a plurality of network units. Some or all of the units may be selected based on actual requirements to achieve the objectives of the solutions in embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A channel sounding method, comprising:

receiving, by a first access point, a channel transfer command frame from a controller or a central access point, wherein the channel transfer command frame indicates the first access point to send a channel sounding result of at least one station to a second access point, the channel transfer command frame comprises identifier information of the second access point, identifier information of the at least one station, and a first sounding dialog token number, the at least one station is associated with the first access point, and the first sounding dialog token number is used by the first access point to identify whether the channel sounding result of the at least one station belongs to the first access point; and sending, by the first access point, a channel transfer frame to the second access point based on the channel transfer command frame, wherein the channel transfer frame carries a channel sounding result corresponding to the first sounding dialog token number, identifier information of the first access point, and the identifier information of the at least one station.

2. The method according to claim 1, wherein before the sending, by the first access point, a channel transfer frame to the second access point based on the channel transfer command frame, the method further comprises:

receiving, by the first access point, channel response frames separately sent by a plurality of stations, wherein the channel response frame comprises a channel sounding result of each station and a second sounding dialog token number; and when the second sounding dialog token number is different from a sounding dialog token number allocated to the first access point, and the second sounding dialog token number is the same as the first sounding dialog token number, sending, by the first access point, the channel transfer frame to the second access point.

3. The method according to claim 1, wherein the sending, by the first access point, a channel transfer frame to the second access point based on the channel transfer command frame comprises:

after receiving the channel transfer command frame, sending, by the first access point, the channel transfer frame to the second access point.

4. The method according to claim 1, wherein the method further comprises:

sending, by the first access point, a channel report poll (BFRP) frame to a plurality of stations associated with the first access point, wherein the BFRP frame carries a station list, the station list comprises the identifier information of the at least one station, and the BFRP frame is used to successively obtain the channel sounding result of the at least one station.

5. The method according to claim 1, wherein at least one sounding dialog token number allocated to the first access point is different from at least one sounding dialog token number allocated to the second access point, and a first channel sounding group and a second channel sounding group are allocated to the first access point, wherein the first channel sounding group comprises one or more sounding dialog token numbers, the second channel sounding group comprises one or more sounding dialog token numbers, the first channel sounding group corresponds to a station associated with the first access point, and the second channel sounding group corresponds to a station not associated with the first access point.

6. A communication apparatus, comprising:

at least one processor; and one or more memories coupled to the at least one processor and storing programming instructions for execution by the at least one processor to cause the communication apparatus to:

receive, at a first access point, a channel transfer command frame from a controller or a central access point, wherein the channel transfer command frame indicates the first access point to send a channel sounding result of at least one station to a second access point, the channel transfer command frame comprises identifier information of the second access point, identifier information of the at least one station, and a first sounding dialog token number, the at least one station is associated with the first access point, and the first sounding dialog token number is used by the first access point to identify whether the channel sounding result of the at least one station belongs to the first access point; and send based on the channel transfer command frame, a channel transfer frame to the second access point, wherein the channel transfer frame carries a channel sounding result corresponding to the first sounding dialog token number, identifier information of the first access point, and the identifier information of the at least one station.

7. The apparatus according to claim 6, wherein the programming instructions, when executed by the at least one processor, cause the communication apparatus to:

before the first access point sends a channel transfer frame to the second access point based on the channel transfer command frame, receive channel response frames separately sent by a plurality of stations, wherein the channel response frame comprises a channel sounding result of each station and a second sounding dialog token number; and when the second sounding dialog token number is different from a sounding dialog token number allocated to the first access point, and the second sounding dialog token number is the same as the first sounding dialog token number, send the channel transfer frame to the second access point.

8. The apparatus according to claim 6, wherein the programming instructions, when executed by the at least one processor, cause the communication apparatus to: after receiving the channel transfer command frame, send the channel transfer frame to the second access point.

9. The apparatus according to claim 6, wherein the programming instructions, when executed by the at least one processor, cause the communication apparatus to:

send a channel report poll (BFRP) frame to a plurality of stations associated with the first access point, wherein the BFRP frame carries a station list, the station list comprises the identifier information of the at least one station, and the BFRP frame is used to successively obtain the channel sounding result of the at least one station.

10. The apparatus according to claim 6, wherein at least one sounding dialog token number allocated to the first access point is different from at least one sounding dialog token number allocated to the second access point, and a first channel sounding group and a second channel sounding group are allocated to the first access point, wherein the first channel sounding group comprises one or more sounding dialog token numbers, the second channel sounding group comprises one or more sounding dialog token numbers, the first channel sounding group corresponds to a station associated with the first access point, and the second channel sounding group corresponds to a station not associated with the first access point.

* * * * *